(12) United States Patent
Hirabayashi et al.

(10) Patent No.: US 7,667,928 B2
(45) Date of Patent: Feb. 23, 2010

(54) THIN-FILM MAGNETIC HEAD HAVING A WIDTH-THICKNESS CONFIGURED SHIELD LAYER POSITIONED BY SPACER PIECES FOR USE IN A HEAD GIMBAL ASSEMBLY OF A HARD DISK SYSTEM

(75) Inventors: Hiraku Hirabayashi, Tokyo (JP); Norikazu Ota, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/348,655

(22) Filed: Jan. 5, 2009

(65) Prior Publication Data

US 2009/0116143 A1  May 7, 2009

Related U.S. Application Data

(62) Division of application No. 11/381,451, filed on May 3, 2006, now abandoned.

(30) Foreign Application Priority Data

May 13, 2005 (JP) ............................. 2005-140675

(51) Int. Cl.
*G11B 5/127* (2006.01)
(52) U.S. Cl. ........................... 360/125.21; 360/125.22; 360/125.25; 29/603.07
(58) Field of Classification Search ............ 360/123.12, 360/125.21–125.29; 29/603.07
See application file for complete search history.

(56) References Cited

U.S. PATENT DOCUMENTS

| 6,687,084 B2 | 2/2004 | Takahashi et al. |
| 2003/0048579 A1* | 3/2003 | Kikuchi et al. ............... 360/123 |
| 2004/0212923 A1 | 10/2004 | Taguchi |
| 2005/0280936 A1 | 12/2005 | Sasaki et al. |

FOREIGN PATENT DOCUMENTS

| EP | 0 360 978 A2 | 4/1990 |
| JP | 2-66710 | 3/1990 |
| JP | 2001-250204 | 9/2001 |
| JP | 2002-197615 | 7/2002 |
| JP | 2004-326990 | 11/2004 |
| JP | 2005-92929 | 4/2005 |

* cited by examiner

*Primary Examiner*—A. J. Heinz
(74) *Attorney, Agent, or Firm*—Oblon, Spivak, McClelland, Maier & Neustadt, L.L.P.

(57) ABSTRACT

A write shield layer that forms a part of a thin-film magnetic head is set with respect to the widthwise full length W thereof lying substantially on an air bearing surface that is opposite to the recording medium such that when the full length W is trisected, the maximum thickness $H_{1/3side}$ thereof in a range of widthwise ⅓W size positioned at both ends thereof is larger than the average thickness $H_m$ of the whole write shield layer from the air bearing surface up to the rear ($H_{1/3side} > H_m$), so that the so-called external magnetic field resistance is improved, and inadvertent erasure of the information already recorded in the recording medium is avoided as much as possible. Besides, the PTP (pole tip protrusion) phenomenon arising from the generation of heat from coils, and external temperature changes can be held back.

3 Claims, 19 Drawing Sheets

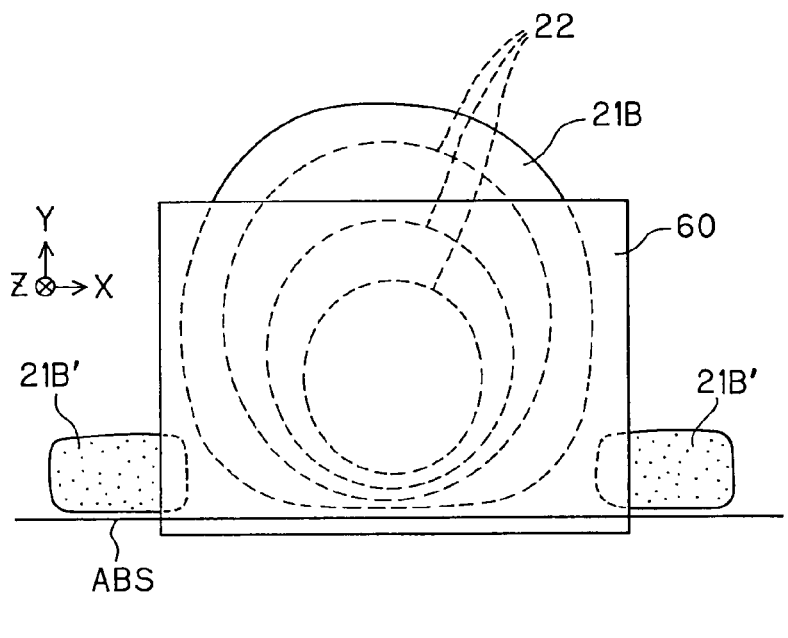 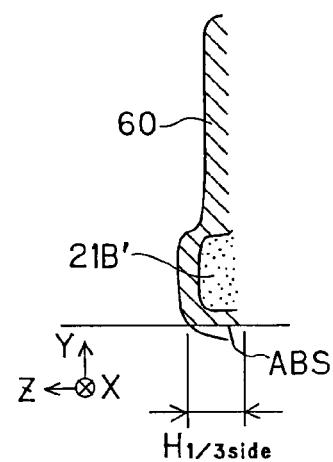
FIG. 14A  FIG. 14B
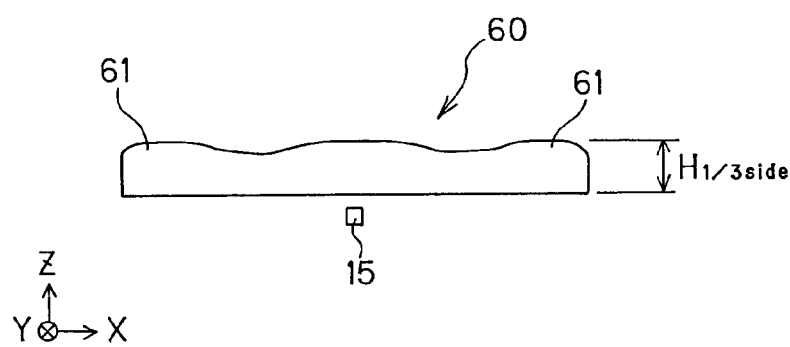
FIG. 14C

COMPARATIVE SAMPLE

PRESENT INVENTION SAMPLE

THIN-FILM MAGNETIC HEAD HAVING A WIDTH-THICKNESS CONFIGURED SHIELD LAYER POSITIONED BY SPACER PIECES FOR USE IN A HEAD GIMBAL ASSEMBLY OF A HARD DISK SYSTEM

CROSS-REFERENCE TO RELATED APPLICATIONS

This application is a divisional Application of, and claims the benefit of priority under 35 U.S.C. § 120 from, U.S. application Ser. No. 11/381,451, filed May 3, 2006 and now abandoned, herein incorporated by reference, which claims the benefit of priority under 35 U.S.C. § 119 from Japanese Patent Application No. 2005-140675 filed May 13, 2005.

BACKGROUND OF THE INVENTION

1. Field of the Invention

The present invention relates primarily to a thin-film magnetic head comprising an induction type magnetic transducer device for recording purposes, and a thin-film magnetic recording head comprising a magneto-resistive effect device adapted to read the magnetic field intensity of a magnetic recording medium or the like in the form of signals.

2. Explanation of the Prior Art

In recent years, for instance, magnetic recording mediums such as hard disks (hereinafter called simply the "recording medium or mediums") have grown in surface recording densities and, with this, there is a growing demand for improvements in the performance of a thin-film magnetic recording head mounted on a magnetic recording system such as a hard disk drive.

As well known in the art, for instance, such a thin-film magnetic recording head operates in two recording modes: a longitudinal recording mode where the direction of a signal magnetic field is set in the planar (longitudinal) direction of a recording medium, and a perpendicular recording mode where the direction of a signal magnetic field is set perpendicularly to the surface of the magnetic recording medium.

Although the longitudinal recording mode is now used in common, yet the perpendicular recording mode is promisingly expected to supercede the longitudinal recording mode, in consideration of future market trends in association with improvements in the surface recording densities of recording mediums. The perpendicular recording mode has the advantages of just only ensuring high recording densities but also making the recording medium with information already recorded in it less vulnerable to thermal fluctuations.

A thin-film recording head of the perpendicular recording mode is constructed typically of a thin-film coil adapted to generate a recording magnetic flux, and a main magnetic pole layer that extends from an air bearing surface toward the rear and is adapted to generate a magnetic field (perpendicular magnetic field) for magnetizing a recording medium on the basis of the recording magnetic flux generated at the thin-film coil. With such a thin-film head of the perpendicular recording mode, the recording medium is magnetized on the basis of the perpendicular magnetic field generated at the main magnetic pole layer, so that information can be magnetically recorded in that recording medium.

For such a thin-film magnetic head of the perpendicular recording mode, for instance, a thin-film magnetic head comprising a main magnetic pole layer located in such a way as to extend in a direction orthogonal to an air bearing surface is known. Such a type of thin-film magnetic head of the perpendicular recording mode is generally called a "single-pole type thin film magnetic head".

Referring here to a specific structure of that single-pole type thin-film magnetic head known so far in the art, for instance, an auxiliary magnetic pole layer for seizure of an auxiliary magnetic flux is joined to the main magnetic pole layer to enhance the intensity of a perpendicular magnetic field, thereby improving on overwrite capability (see, for instance, JP(A)'s 02-066710, 2002-197615 and 2001-250204, and EU(A)0360978).

As far as the improvement in overwrite capability is concerned, however, there would appear to be some limit to the single-pole type thin-film magnetic head.

In a thin-film magnetic head of the perpendicular recording mode recently proposed in the art, a main magnetic pole layer that extends in a direction orthogonal to an air bearing surface as described above is combined with a write shield layer adapted to hold back the spread of a magnetic flux emitted out of that main magnetic pole layer, so that the recording track width is prevented from becoming wide thereby increasing the recording density of a recording medium.

Such a thin-film magnetic head of the perpendicular recording mode is generally called a "shield type thin-film magnetic head". The write shield layer is spaced from the main magnetic pole with a gap of up to 0.2 µm between them, and extends from the air bearing surface toward the rear, whereby it is isolated by a gap layer from the main magnetic pole layer on a side near to the air bearing surface and joined through a back gap to the main magnetic pole layer on a side far away from the air bearing surface.

With the write shield type thin-film magnetic head comprising such a write shield layer, the recording density of the recording medium is improved, because there is a sharp gradient to the perpendicular magnetic field by virtue of restrictions on the spread of a magnetic flux emitted out of the main magnetic pole layer.

Here, to better the reliability of the thin-film magnetic head of the perpendicular recording mode, regardless of whether it is of the type having the so-called shield (the shield type thin-film magnetic head) or of the type having an auxiliary magnetic pole, it is necessary to get stable hold of magnetic operation performance. Problems with the prior art thin-film magnetic head are, however, that as unwanted magnetic fields (floating external magnetic fields) arise from an external magnetic field source such as a voice coil motor, it causes unintended write (overwrite) during non-recording, that is, during no supply of recording currents to a thin-film coil, although depending on the influences of such floating external magnetic fields, and this often results in inadvertent erasure of information recorded in a recording medium. To get stable hold of the magnetic operation performance of the thin-film magnetic head of the perpendicular recording mode, there is thus now a growing demand for the technique of holding back inadvertent erasure of information as much as possible at the time of non-recording.

With the prior art shield type thin-film magnetic head, besides, there is a PTP (pole tip protrusion) phenomenon stemming from the generation of heat from coils or external temperature changes, i.e., a phenomenon wherein the pole tip protrudes from the ABS surface, because the shield member itself is a large magnetic material. Reducing the thickness of the shield member itself may work for prevention of the PTP; however, the thickness reduction conversely gives rise to the tendency of the above external magnetic field resistance to become worse. Thus, both have tradeoff relations.

Such being the prior art situation, an object of the invention is to provide a thin-film magnetic head structure that is improved in terms of the so-called external magnetic field resistance, and is capable of just only preventing inadvertent erasure of information recorded in a recording medium as much as possible, but also holding back the PTP (pole tip protrusion) phenomenon arising from the generation of heat from coils or external temperature changes.

For a combination of upper and lower magnetic shield layers located above and below a read-only magneto-resistive effect device with it held between them so as to have a magnetic shield action on it, too, there is the same demand, because there are often similar problems with the above write-only thin-film magnetic head.

SUMMARY OF THE INVENTION

According to one aspect of the invention, such an object is achievable by the provision of a thin-film magnetic head comprising a recording head portion adapted to record magnetic information in a recording medium, wherein:

said recording head portion comprises:

a thin-film coil adapted to generate a magnetic flux, a magnetic pole layer, which extends from a surface toward the rear, wherein said surface is opposite to the recording medium moving in a medium traveling direction, and which is adapted to generate a magnetic field for magnetizing said recording medium in a direction orthogonal to a surface thereof on the basis of the magnetic flux generated from said thin-film coil, and a write shield layer, which is located on a side of said magnetic pole layer in said medium traveling direction, and extends from said surface opposite to the recording medium toward the rear, whereby said write shield layer is isolated by a gap layer from said magnetic pole layer on a side near to said surface opposite to the recording medium and joined through a back gap to said magnetic pole layer on a side far away from said surface opposite to the recording medium, wherein:

said write shield layer is set with respect to a widthwise full length W lying substantially on an air bearing surface that is opposite to the recording medium such that when said full length W is trisected, a maximum thickness $H_{1/3side}$ thereof in a range of widthwise ⅓W size positioned at both ends thereof is larger than an average thickness $H_m$ of the whole write shield layer from the air bearing surface up to the rear ($H_{1/3side} > H_m$).

In one preferable embodiment of the invention, said magnetic pole layer has a multilayer structure comprising a main magnetic pole layer that extends from the surface toward the rear, wherein said surface is opposite to the recording medium moving in the medium traveling direction, and is adapted to generate a magnetic field for magnetizing said recording medium in a direction orthogonal to a surface thereof on the basis of the magnetic flux generated from said thin-film coil, and an auxiliar magnetic pole layer that extends from a first position toward the rear, wherein said first position is retracted from said surface opposite to the recording medium on said traveling side, wherein said main magnetic pole layer and said auxiliar magnetic pole layer are stacked together.

In one preferable embodiment of the invention, said write shield layer comprises a first magnetic shield portion that extends from said surface opposite to the recording medium to a second position in front of said first position while being adjacent to said gap layer, and a second magnetic shield portion that extends from said surface opposite to the recording medium to at least said back gap while resting partially on said first magnetic shield portion.

According to another aspect of the invention, there is provided a thin-film magnetic head comprising a reproducing head portion adapted to reproduce magnetic information recorded in a recording medium, wherein:

said reproducing head portion comprises a magneto-resistive effect device, and an upper read shield layer and a lower read shield layer which are located above and below said device to isolate said device magnetically from the surroundings, wherein:

said upper read shield layer and said lower read shield layer extend from a surface toward the rear, wherein said surface is opposite to the recording medium moving in a medium traveling direction, and said upper read shield layer is set with respect to a widthwise full length Wup thereof lying substantially on an air bearing surface that is the surface opposite to the recording medium such that when the full length Wup is trisected, an average thickness $Hup_{1/3side}$ thereof in a range of widthwise ⅓Wup size positioned at both ends thereof is larger than an average thickness $Hup_m$ of the whole upper read shield layer from the air bearing surface up to the rear ($Hup_{1/3side} > Hup_m$).

According to yet another aspect of the invention, there is provided a thin-film magnetic head comprising a reproducing head portion adapted to reproduce magnetic information recorded in a recording medium, wherein:

said reproducing head portion comprises a magneto-resistive effect device, and an upper read shield layer and a lower read shield layer which are located above and below said device to isolate said device magnetically from the surroundings, wherein:

said upper read shield layer and said lower read shield layer extend from a surface toward the rear, wherein said surface is opposite to the recording medium moving in a medium traveling direction, and said lower read shield layer is set with respect to a widthwise full length Wdn thereof lying substantially on an air bearing surface that is the surface opposite to the recording medium such that when the full length Wdn is trisected, an average thickness $Hdn_{1/3side}$ thereof in a range of widthwise ⅓Wdn size positioned at both ends thereof is larger than an average thickness $Hdn_m$ of the whole lower read shield layer from the air bearing surface up to the rear ($Hdn_{1/3side} > Hdn_m$).

According to a further aspect of the invention, there is provided a thin-film magnetic head comprising a reproducing head portion adapted to reproduce magnetic information recorded in a recording medium, wherein:

said reproducing head portion comprises a magneto-resistive effect device, and an upper read shield layer and a lower read shield layer which are located above and below said device to isolate said device magnetically from the surroundings, wherein:

said upper read shield layer and said lower read shield layer extend from a surface toward the rear, wherein said surface is opposite to the recording medium moving in a medium traveling direction, said upper read shield layer is set with respect to a widthwise full length Wup thereof lying substantially on an air bearing surface that is the surface opposite to the recording medium such that when the full length Wup is trisected, an average thickness $Hup_{1/3side}$ thereof in a range of widthwise ⅓Wup size positioned at both ends thereof is larger than an average thickness $Hup_m$ of the whole upper read shield layer from the air bearing surface up to the rear ($Hup_{1/3side} > Hup_m$), and said lower read shield layer is set with respect to a widthwise full length Wdn thereof lying substantially on an air bearing surface that is the surface opposite to the recording medium such that when the full length Wdn is trisected, an average thickness $Hdn_{1/3side}$ thereof in a range of widthwise ⅓Wdn size positioned at both ends thereof is larger than an average thickness $Hdn_m$ of the whole lower read shield layer from the air bearing surface up to the rear ($Hdn_{1/3side} > Hdn_m$).

When fabricating the thin-film magnetic head of the invention, a bottom spacer layer is previously formed in such a way as to put up both ends of the write shield layer near the air baring surface.

When fabricating the thin-film magnetic head of the invention, bottom spacer layer pieces made of the same material as the thin-film coil are previously spotted in such a way that upon formation of the thin-film coil adapted to generate a magnetic flux, both ends near the air bearing surface of the write shield layer to be formed later can be put up, whereupon an insulating film is formed and the write shield layer is formed on that insulating layer.

When fabricating the thin-film magnetic head of the invention, an insulating layer and said write shield layer are successively formed on the bottom spacer layer pieces.

When fabricating the thin-film magnetic head of the invention, the write shield is formed directly on the bottom space layer pieces.

When fabricating the thin-film magnetic head of the invention, insulating film pieces functioning as a bottom spacer layer and made of the same material as the insulating film are previously spotted in such a way that upon formation of the thin-film coil adapted to generate a magnetic flux and formation of the insulating layer in such a way as to cover the thin-film coil, both ends near the air bearing surface of the write shield layer to be formed later can be put up, and the write shield layer is formed on that insulating film.

When fabricating the thin-film magnetic head of the invention, an insulating layer is determined in terms of form and location such that upon formation the thin-film coil adapted to generate a magnetic flux and formation of the insulating layer in such a way as to cover the thin-film coil, both ends near the air bearing surface of the write shield layer to be formed later can be put up, and the write shield layer is formed on that insulating film.

When fabricating the thin-film magnetic head of the invention, the write shield layer is formed and an upper portion of the write shield layer is flattened.

The head gimbal assembly of the invention comprises a slider including the above thin-film magnetic head and located in such a way as to be opposite to a recording medium, and a suspension adapted to resiliently support that slider.

The hard disk system of the invention comprises a slider including the above thin-film magnetic head and located in such a way as to be opposite to a rotationally driven disk-form recording medium, and a positioning device adapted to support that slider and position it relative to the recording medium.

With the thin-film magnetic head of the invention, widthwise both ends of the air bearing surface of the write shield layer are made so thick that any concentration of an external magnetic field on the ends can be avoided, and so the external magnetic field resistance can be much more improved. By choice of such structure, portions of the write shield layer other than the vicinity of the air bearing surface can be slimmed down, so that the write shield layer is less affected by the external magnetic field, and inadvertent erasure of information already recorded in the recording medium can be avoided as much as possible. Besides, the PTP (pole tip protrusion) phenomenon due to the generation of heat from the coils, and external temperature changes can be held back.

BRIEF EXPLANATION OF THE DRAWINGS

FIG. 1A is a section of the arrangement as taken on section parallel with the air bearing surface (along the X-Z plane), and FIG. 1B is a section of the arrangement as taken on section perpendicular to the air bearing surface (along the Y-Z plane).

FIG. 4A is illustrative in Y-Z section of the write shield layer with the air bearing surface (ABS) located at the left end, and FIG. 4B is illustrative in X-Z plane of the write shield layer with the air bearing surface (ABS) located at the front.

FIG. 5A is illustrative in Y-Z section of the write shield layer with the air bearing surface (ABS) located at the left end, and FIG. 5B is illustrative in X-Z plane of the write shield layer with the air bearing surface (ABS) located at the front.

FIG. 6A is illustrative in Y-Z section of the write shield layer with the air bearing surface (ABS) located at the left end, and FIG. 6B is illustrative in X-Z plane of the write shield layer with the air bearing surface (ABS) located at the front.

FIG. 7A is illustrative in Y-Z section of the write shield layer with the air bearing surface (ABS) located at the left end, and FIG. 7B is illustrative in X-Z plane of the write shield layer with the air bearing surface (ABS) located at the front.

FIG. 8A is illustrative in Y-Z section of the write shield layer with the air bearing surface (ABS) located at the left end, and FIG. 8B is illustrative in X-Z plane of the write shield layer with the air bearing surface (ABS) located at the front.

FIG. 9A is illustrative in Y-Z section of the write shield layer with the air bearing surface (ABS) located at the left end, and FIG. 9B is illustrative in X-Z plane of the write shield layer with the air bearing surface (ABS) located at the front.

FIG. 14A is a Y-X plan view of the write shield layer upon formation, FIG. 14B is a Y-Z sectional view of the write shield layer upon formation, and FIG. 14C is an X-Z front view of the air bearing surface, representative mainly of the write shield layer and the magnetic pole layer.

DETAILED EXPLANATION OF THE INVENTION

Explanation of One Embodiment of the Whole Arrangement of a Thin-Film Magnetic Head One embodiment of the whole arrangement of the thin-magnetic head is now explained with reference to FIGS. 1, 2 and 3.

Figures 1A, 1B:
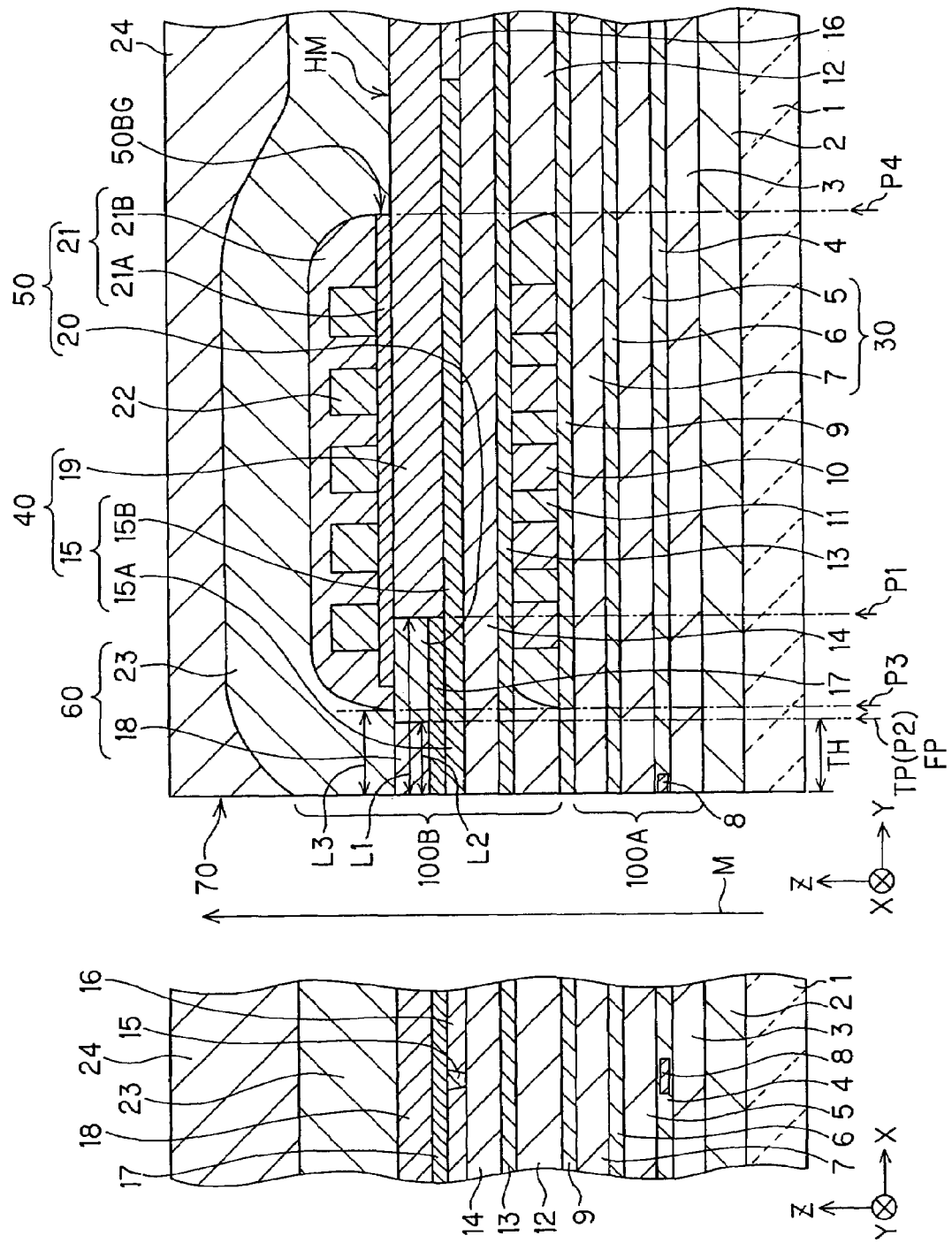
FIGS. 1A and 1B are each illustrative in sectional arrangement of the thin-film magnetic head according to one embodiment of the invention.

FIGS. 1A and 1B are each illustrative in section of the whole arrangement of a thin-film head. Specifically, FIG. 1A is a sectional representation of the arrangement, as taken on a section parallel with an air bearing surface (a section along the X-Y plane), and FIG. 1B is a sectional representation of the arrangement, as taken on a section perpendicular to the air bearing surface (a section along the Y-Z plane). FIG. 2 is a plan view of part of the arrangement (a plan view as viewed from the Z-axis direction), and FIG. 3 is an enlarged plan view of an exposed surface of part of the arrangement (a plan view as viewed from the Y-axis direction). In FIG. 1, note that an upward arrow M is indicative of the direction (medium traveling direction) of movement of a recording medium (not shown) relative to the thin-film magnetic head.

In the following description of the invention with reference to FIGS. 1-3, the size of the arrangement in the X-axis direction will be called the "width", that in the Y-axis direction the "length" and that in the Z-axis direction the "thickness", respectively, and the side of the arrangement near to the air bearing surface in the Y-axis direction will be referred to as the "front" side while the opposite side (the depth side) as the "rear" side.

In use, the thin-film magnetic head is mounted on a magnetic recording system such as a hard disk drive for application of magnetic processing to a recording medium adapted to move in the medium traveling direction M, for instance, a hard disk.

Figure 2:
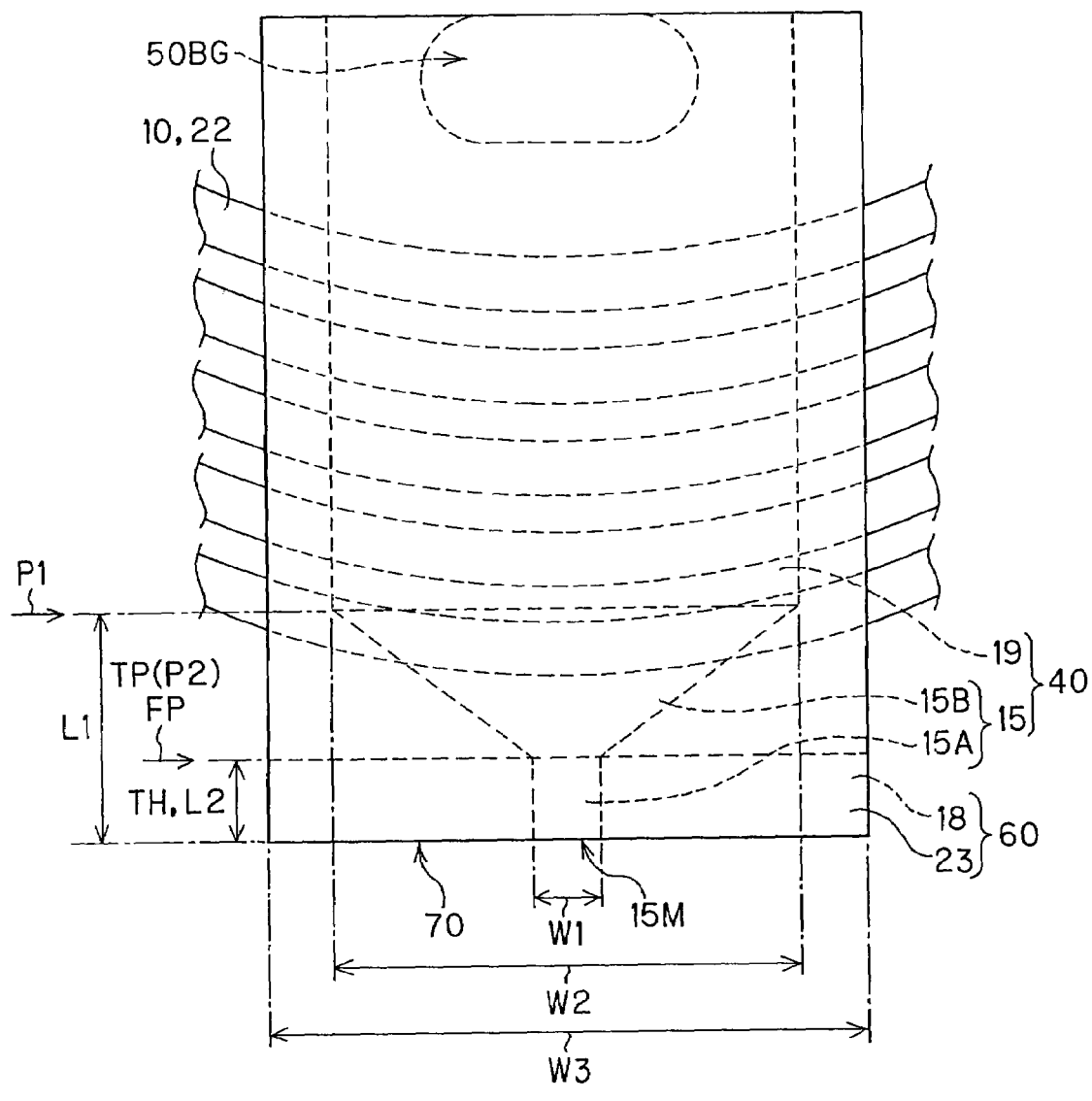
FIG. 2 is a plan view illustrative in planar arrangement of a main part of the thin-film magnetic head illustrated in FIG. 1.
Figure 3:
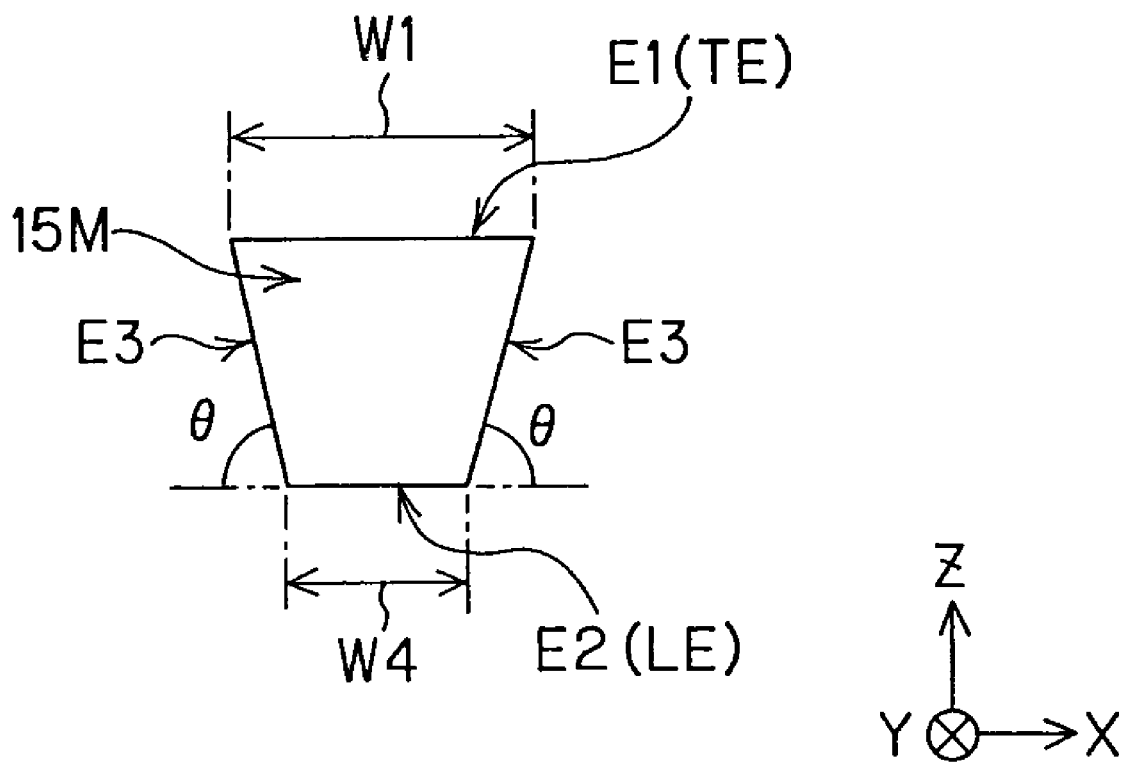
FIG. 3 is an enlarged view illustrative in planar arrangement of an exposed surface of the main part of the thin-film magnetic head illustrative in FIG. 1.

The thin-film magnetic head as depicted typically in FIGS. 1-3 is the so-called composite type head capable of both recording processing in the form of magnetic processing and reproducing processing. As depicted in FIG. 1, the thin-film magnetic head has a structure comprising a substrate 1 made typically of a ceramic material such as ALTiC ($Al_2O_3$.TiC), and an insulating layer 2 made typically of a nonmagnetic insulating material such as aluminum oxide ($Al_2O_3$ hereinafter called simply "alumina"), a reproducing head portion 100A operable to reproduce magnetic information recorded by harnessing the magneto-resistive (MR) effect, an isolation layer 9 made typically of a nonmagnetic insulating material such as alumina, a shield type recording head 100B portion operable to implement recording processing of the perpendicular recording mode and an overcoat layer 24 made typically of a nonmagnetic insulating material such as alumina, all stacked together on that substrate in this order.

The reproducing head portion 100A, for instance, has a multilayer structure wherein a lower read shield layer 3, a shield gap film 4 and an upper read shield layer 30 are stacked together in this order. In the shield gap film 4, there is a magneto-resistive effect device (MR device) 8 working as a reproducing device and embedded in such a way as to be exposed at one end face on a surface (air bearing surface) 70 that is opposite to the recording medium.

The lower read shield layer 3 and the upper read shield layer 30 are provided for magnetic isolation of the MR device from the surroundings, and extend from the air bearing surface 70 toward the rear. The lower read shield layer 3, for instance, is made of a soft magnetic material such as Permalloy (Ni (80 wt %) Fe (20 wt %)) that is a nickel alloy, and has a thickness of about 1.0 to 2.0 μm.

In this embodiment, the upper read shield layer 30 has a structure wherein a nonmagnetic layer 6 is held between two upper read shield portions 5 and 7. In other words, it has a multilayer structure wherein, in order from its side near to the shield gap film 4, the upper read shield portion 5, the nonmagnetic layer 6 and the upper read shield portion 7 are successively stacked together.

The upper read shield portion 5 is made typically of a magnetic material such as Permalloy, and has a thickness of typically about 1.5 μm. Likewise, the upper read shield layer 7 is made typically of a magnetic material such as Permalloy, and has a thickness of typically about 1.1 μm. The nonmagnetic layer 6 is made typically of a nonmagnetic material such as ruthenium (Ru) or alumina, and has a thickness of typically about 0.2 μm. Note here that the upper read shield layer 30 has not necessarily such a multilayer structure as contemplated herein; it, of course, could have a single-layer structure like the lower read shield layer 3.

The shield gap film 4 is provided for electrical isolation of the MR device 8 from the surroundings, and made typically of a nonmagnetic material such as alumina.

The MR device, for instance, harnesses the (GMR: giant magneto-resistive) effect for implementing reproducing processing.

The magnetic head portion 100B, for instance, has a multilayer structure wherein a first-stage thin-film coil 10 buried at its periphery in insulating layers 11, 12 and 13, a nonmagnetic layer 14, a magnetic pole layer 40 buried partially at its periphery in an insulating layer 16, a gap layer 17, a second-stage thin-film coil 22 buried in an insulating layer 50 that forms an opening for magnetic junction (a back gap 50BG) and a write shield layer 60 are successively stacked together.

In this conjunction, FIG. 2 shows only main parts (thin-film coils 10, 22, magnetic layer 40 and write shield layer 60) taken out of the magnetic head portion 100B.

The thin-film coil 10 functions primarily to generate a magnetic flux for holding back leakage of a recording magnetic flux occurring at the thin-film coil 22. This thin-film coil 10, for instance, is made of a highly conductive material such as copper, and has a thickness of typically about 2.0 µm.

In particular, and as depicted typically in FIGS. 1 and 2, the thin-film coil 10 has a spiral structure having coil turns about the back gap 50 BG, and operates typically such that currents pass in a direction opposite to the direction of currents passing through the thin-film coil 22. While, in FIGS. 1 and 2, the thin-film coil 10 is shown to have five coil turns, it is understood that this is merely one example, and the number of coil turns could be varied as desired. The number of coil turns of the thin-film coil 10 is preferably the same as that of the thin-film coil 22, and is typically in the range of 2 to 7.

The insulating layers 11, 12 and 13 are provided to electrically isolate the thin-film coil 10 from the surroundings. The insulating layer 11 is formed such that it fills up a space between the coil turns of the thin-film coil 10 and covers the periphery of that thin-film coil 10. This insulating layer 11 is made typically of a nonmagnetic material such as photoresist or spin-on-glass (SOG) that exhibits fluidity upon heating, and has a thickness of typically about 2.0 µm.

In this embodiment of the invention, the insulating layer 11 is provided such that, as depicted in FIG. 1, it covers only the lateral sides, and does not cover the upper side, of the thin-film coil 10.

The insulating layer 12 is formed in such a way as to cover the periphery of the insulating layer 11. This insulating layer 12 is made typically of a nonmagnetic material such as alumina, and has a thickness of typically about 2.0 µm.

The insulating layer 13 is provided in such a way as to cooperate with the thin-film coil 10 to cover the insulating layers 11 and 12, respectively. This insulating layer 13 is made typically of a nonmagnetic material such as alumina, and has a thickness of typically about 0.2 µm.

The nonmagnetic layer 14, for instance, is made of a nonmagnetic insulating material such as alumina or a nonmagnetic, electrically conductive material such as ruthenium, and has a thickness of typically about 1.0 µm.

The magnetic pole layer 40 works primarily to receive a magnetic recording magnetic flux occurring at the thin-film coil 22, so that that magnetic flux is emitted toward the recording medium, thereby implementing recording processing. More specifically, the magnetic pole layer 40 is operable to produce a magnetic field (perpendicular magnetic flux) on the basis of the recording magnetic flux, which in turn causes the recording medium to be magnetized perpendicularly to its surface for implementing the perpendicular recording mode of recording processing.

Such a magnetic pole layer 40 is located on the leading side of the thin-film coil, extending from the air bearing surface 70 toward the rear, more specifically, as far as the back gap 50BG. When the movement of the recording medium toward the medium traveling direction M depicted in FIG. 1 is thought of as one stream, the wording "leading side" here means a side which that stream enters (or is opposite to the side of the medium traveling direction M) or, in this embodiment, refers to the upstream side in the thickness direction (the Z-axis direction). On the other hand, the side which that stream leaves (the side of the medium traveling direction M) is referred to as the "trailing side" that, in this embodiment, is tantamount to the downstream side in the thickness direction.

In this embodiment of the invention, the magnetic pole layer 40 has a structure wherein, as depicted in FIGS. 1A and 1B, a main magnetic pole layer 15 and an auxiliar magnetic pole layer 19 are stacked and interconnected together in this order. In other words, it has a multilayer (double-layer) structure wherein the main magnetic pole layer 15 is located on the leading side and the auxiliar magnetic pole layer 19 is located on the trailing side.

The main magnetic pole layer 15 functions as an emitter of the chief writing magnetic flux. On the leading side, the main magnetic pole layer 15 extends from the air bearing surface 70 toward the rear, more specifically, as far as the back gap 50 BG, and has a thickness of typically about 0.25 µm. Such a main magnetic pole layer 15, for instance, is made of a magnetic material having a higher saturation magnetic flux density than the magnetic material that forms the auxiliar magnetic pole layer 19, specifically an iron base alloy. The iron base alloy used here, for instance, includes an iron (Fe)-rich iron-nickel alloy (FeNi), iron-cobalt alloy (FeCo) or iron-cobalt-nickel alloy (FeCoNi).

The above expression "interconnection" implies just only an interconnection comprising a simple physical contact but also an interconnection comprising a physical contact combined with a magnetically conductive connection.

The main magnetic pole layer 15, for instance, is configured into a generally battledore type planar shape, as depicted in FIG. 2. Typically, the main magnetic pole layer 15 comprises, in order from the air bearing surface 70, a tip end 15A that extends from the air bearing surface 70 toward the rear and has a constant width W1 that defines the recording track width of the recording medium, and a rear end 15B that is joined to the rear of that tip end 15A and has a width W2 that is larger than the width W1 (W2>W1). The position where the width of the main magnetic pole layer 15 increases from the tip end 15A (width W1) to the rear end 15B (width W2) is a "flare point FP" that is one of important determinants for the recording performance of the thin-film head.

The tip end 15A works primarily as an emitter capable of emitting the recording magnetic flux occurring at the thin-film coil 22 toward the recording medium, and includes an exposed surface 15M exposed on the air bearing surface 70, as depicted in FIG. 2. This exposed surface 15M has a planar shape defined by an upper edge (one edge) E1 positioned on the trailing side, a lower edge (another edge) E2 positioned on the leading side and two side edges E3, as depicted typically in FIG. 3. Specifically, the exposed surface 15M has a trapezoidal shape with its width tapering from the trailing side toward the leading side (W1>W4).

The trailing edge TE of the tip end 15A is a substantial recording site of the magnetic pole layer 40. Note here that in the planar shape of the exposed surface 15M, an angle θ between the extension direction of the lower edge E2 and the side edges E3 could be freely set in the range of typically less than 90°.

The rear end 15 depicted in FIG. 2 is a site for receiving the magnetic flux received in the auxiliar magnetic pole layer 19 and supply it to the tip end 15A. This rear end 15B, for instance, has a constant width (W2) in the rear, and that width W2 becomes gradually narrow toward the front tip end 15A and eventually becomes the width W1.

The auxiliar magnetic pole layer 19 functions as a main receiver for the main magnetic flux. This auxiliar magnetic pole layer 19, for instance, extends from a position P1 (the first position) behind the air bearing surface 70 toward the rear. More specifically, at the back gap 50BG, it extends to behind the main magnetic pole layer 15, and has a thickness of typically about 0.45 µm. In particular, the auxiliar magnetic pole layer 19 is made typically of a magnetic material having a lower saturation magnetic flux density than the magnetic material that forms the main magnetic pole layer 15. For instance, an iron-cobalt-nickel alloy is preferably used.

The auxiliar magnetic pole layer 19 is configured into a rectangular, planar shape having a width W2, as depicted typically in FIG. 2. In particular, the auxiliar magnetic pole layer 19 is flattened together with an auxiliar insulating layer 20 (described later) in the insulating layer 50 and a TH defining layer 18 (described later) in the write shield layer 60, as depicted typically in FIG. 1. In other words, the trailing side end face of the auxiliar magnetic pole layer 19 forms a flat surface HM together with the trailing side end face of the auxiliar insulating layer 20 and the trailing side end face of the TH defining layer 18.

The insulating layer 16 is provided to electrically isolate the main magnetic pole layer 15 from the surroundings. This insulating layer 16 is made typically of a nonmagnetic material such as alumina, and has a thickness of typically about 0.25 μm.

The gap layer 17 is provided in such a way as to form a gap for magnetic isolation of the magnetic pole layer 40 from the write shield layer 60. The gap layer 17 extends from the air bearing surface 70 toward the rear while it is adjacent to the main magnetic pole layer 15 all the way, except an area where the auxiliar magnetic pole layer 19 is located, as depicted typically in FIG. 1. In particular, the gap layer 17 is made typically of a nonmagnetic insulating material such as alumina or a nonmagnetic, electrically conductive material such as ruthenium, with its thickness set in the range of about 0.03 to 0.1 μm.

The insulating layer 50 defines a throat height TH that is one of important determinants for the recording characteristics of the thin-film magnetic head, and is formed in such a way as to cover the thin-film coil 22 thereby electrically isolating it from the surroundings. As depicted in FIG. 1, the insulating layer 50 has a multilayer structure wherein an auxiliar insulating layer 20 (the first insulating layer portion) formed in such a way as to substantially define the throat height TH and a main insulating layer 21 (the second insulating layer portion) formed in such a way as to substantially cover the thin-film coil 22 are stacked together in this order. In other words, the insulating layer 50 has a multilayer (double-layer) structure wherein the auxiliar magnetic pole layer 20 is located on the leading side and the main insulating layer 21 is located on the trailing side.

As depicted in FIG. 1, the auxiliar insulating layer 20 extends from a position behind the air bearing surface 70, i.e., a position P2 (the second position) between the air bearing surface 70 and the position P1 as far as the position P1 in the rear, while it is adjacent to the gap layer 17 all the way. And then, the auxiliar insulating layer 20 is adjacent to the auxiliar magnetic pole layer 19 at the position P1, and adjacent to the write shield layer 60 (the TH defining layer 18 as described below) at the position P2. In the embodiment of the invention in particular, the auxiliar magnetic pole layer 20 forms the flat surface HM together with the auxiliar magnetic pole layer 19 and the TH defining layer 18.

The above "position P2" corresponds to the foremost end position of the insulating layer 50 (that is nearest to the air bearing surface 70); that is, it is a "throat height zero position TP" for defining the throat height TH. That throat height TH is a distance between the air bearing surface 70 and the throat height zero position TP. This auxiliar insulating layer 20, for instance, is made of a nonmagnetic insulating material such as alumina. In the embodiment depicted in FIGS. 1 and 2, note that the throat height zero position TP is in coincidence with the flare point FP.

As depicted in FIG. 1, the main insulating layer 21 extends from a position P3 (the third position) between the positions P1 and P2 toward the rear while it is adjacent to the flat surface HM in the auxiliar insulating layer 20 all the way. More specifically, the main insulating layer 21 extends in such a way not to close up the back gap 50BG, and is retracted from the auxiliar magnetic pole layer 20. As depicted typically in FIG. 1, this main insulating layer 21 includes a main insulating layer portion 21A that is located as the underlay for the thin-film coil 22 on the flat surface HM in the auxiliar insulating layer 20, and a main insulating layer portion 21B located in such a way as to cover the thin-film coil 22 and the main insulating layer portion 21A around it.

The main insulating layer portion 21A is made typically of a nonmagnetic material such as alumina, and has a thickness of typically about 0.2 μm.

The main insulating layer portion 21B is made typically of a nonmagnetic insulating material such as photoresist or spin-on-glass (SOG) that exhibits fluidity upon heating. A portion of this main insulating layer portion 21B near its edge forms a somewhat round slant that plunges down toward that edge.

The thin-film coil 22 is provided to generate the recording magnetic flux. The thin-film coil 22 operates such that, for instance, currents pass in a direction opposite to the direction of currents passing through the above thin-film coil 10.

The write shield layer 60 is operable to seize the spreading component of the recording magnetic flux emitted out of the magnetic pole layer 40, thereby holding back the spreading of that magnetic flux. Located on the trailing side of the magnetic pole layer 40 and the thin-film coil 22, this write shield layer 60 extends from the air bearing surface 70 toward the rear, so that on its side near to the air bearing surface 70, it is isolated from the magnetic pole layer 20 by the gap film 17, and on its side facing away from the air bearing surface 70, it is joined to the magnetic layer 40 through the back gap 50BG.

In this embodiment of the invention, the write shield layer 60 has a structure which comprises the TH defining layer 18 (the first magnetic shield layer portion) and a yoke layer 23 (the second magnetic shield layer portion), each being a separate member, and in which the TH defining layer 18 and the yoke layer 23 are interconnected together. Note here that the write shield layer 60 is never ever limited to such an interconnected structure as shown; it could take on a one-piece form.

The TH defining layer 18 functions as a main magnetic flux-seizing port. As depicted typically in FIG. 1, this TH defining layer 18 extends from the air bearing surface 70 to a position behind it, more specifically, the position P2 in front of the position P1, while it is adjacent to the gap layer 17 all the way, at which position P2 it is adjacent to the auxiliar insulating layer 20 in the insulating layer 50.

The TH defining layer 18 is made typically of a magnetic material having a high saturation magnetic flux density such as Permalloy or an iron base alloy, and is in a rectangular, planar shape having a width W3 larger than the width W2 of the magnetic pole layer 40 (W3>W2), as depicted in FIG. 2. In particular, the TH defining layer 18 forms the flat surface HM together with the auxiliar magnetic pole layer 19 and the auxiliar insulating layer 20, as described above. That is, the trailing side end face of the TH defining layer 18 forms the flat surface HM together with both the trailing side end face of the auxiliar magnetic pole layer 19 and the trailing side end face of the auxiliar insulating layer 20. As stated above, the TH defining layer 18 is adjacent to the auxiliar insulating layer 20 at the position P2, and so it takes a substantial role of defining the foremost position (the throat height zero position TH) of the insulating layer 50, thereby defining the throat height TH.

The yoke layer 23 is set up in such a way as to function as a passage for the magnetic flux captured from the TH defining layer 18. As depicted typically in FIG. 1, the yoke layer 23 extends from the air bearing surface 70 to at least the back gap 50BG via the insulating layer 50, while it rests on the TH defining layer 18; that is, in the front, the yoke layer 23 rests on the TH defining layer 18 for joining to it, and in the rear, the yoke layer 23 is adjacent to the magnetic pole layer 40 via the back gap 50BG for joining to it.

In the instant embodiment of the invention, the yoke layer 23, for instance, is joined to the magnetic pole layer 40 at the back gap 50BG, while it extends to behind that back gap 50BG. Such a yoke layer 23 is made typically of a magnetic material similar to that forming the TH defining layer 18, and in a rectangular, planar shape having a width W3, as depicted in FIG. 3.

For such a thin-film magnetic head as described above, it is desired that constant dimensions defined on the basis of a specific component element be optimized to ensure recording performance, as depicted typically in FIG. 1. Specifically, the distance of retraction of the auxiliar magnetic pole layer 19 from the air bearing surface 70, i.e., the distance L1 between the air bearing surface 70 and the position P1 is desirously 0.8 to 7.1 µm, and the distance of retraction of the main insulating layer 21 from the air bearing surface 70, i.e., the distance L3 between the air bearing surface 70 and the position P3 is greater than the length of the TH defining layer 18, i.e., the distance L2 between the air bearing surface 70 and the position P2 (L3>L2). The structural relation of the distance L3 being greater than the distance L2 ensures that, at the write shield layer 60, the length of a portion of the yoke layer 23 adjacent to the TH defining layer 18 (i.e., the distance L3) is greater than the length of the TH defining layer 18 (i.e., the distance L2). In other words, when, at the write shield layer 60, the magnetic flux is seized in the yoke layer 23 by way of the TH defining layer 18, a magnetic passage of the magnetic flux through the write shield layer 60 is expanded in a stepwise fashion.

Throughout the whole structure preferable for the thin-film magnetic head as described above, a structural part to which the invention is to lay claim is now explained.

Explanation of the Write Shield Layer 60 that is Part of the Invention (1) In the thin-film magnetic head comprising a recording head portion adapted to record magnetic information in a recording medium, the first feature of the invention lies in the structure of the write shield layer 60 joined to the magnetic pole layer 40 to form part of the recording head portion. In other words, the crucial feature of the invention is that a lot more thickness is applied to both ends of the write shield layer 60 in the widthwise direction of the air bearing surface, thereby preventing concentration of an external magnetic field on those ends to improve on external magnetic field resistance. In other words, by selection of such structure, other portions of the write shield layer except near the air bearing surface can be slimmed down, so that it is less affected by the external magnetic field with the result that inadvertent erasure of information already recorded in the recording medium can be prevented as much as possible. In addition, a likely PTP (pole tip protrusion) phenomenon arising from the generation of heat from the coils or external temperature changes can be held back.

The feature of the invention is now explained in more details with reference to FIGS. 4A and 4B to FIGS. 9A and 9B illustrative of specific structural embodiments of the write shield layer 60, wherein A is illustrative in Y-Z section of the write shield layer 60 with the air bearing surface (ABS) located at the left end of the drawing, and B is illustrative in X-Z plane of the write shield layer 60 with the air bearing surface (ABS) in the direction coming out of the drawing. For a better understanding of the structure of the invention, each drawing is prepared with an exaggerated part yet with a simple, schematic whole arrangement. And, of course, slight, if not large, modifications to these drawings are included in the scope of the invention, too.

Figure 4A:
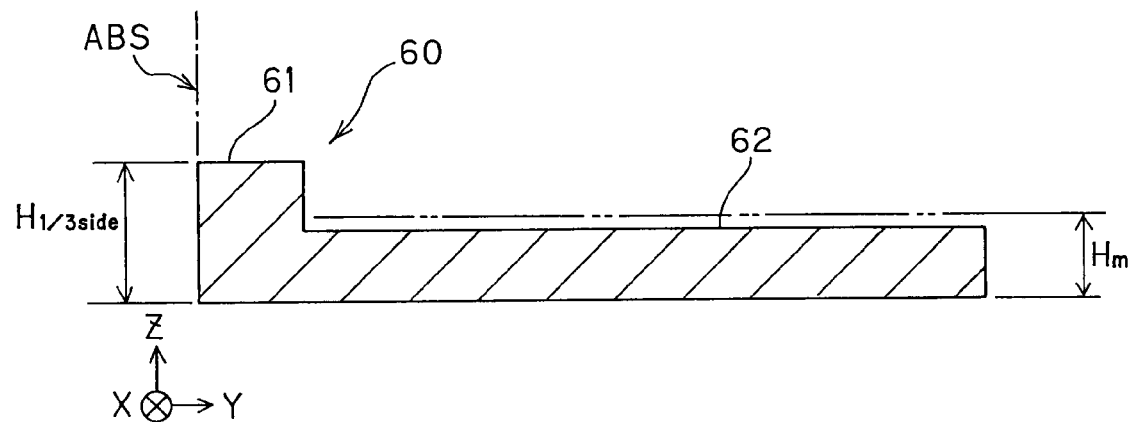
FIGS. 4A and 4B are each illustrative of a specific structure example of the write shield layer.
Figure 4B:
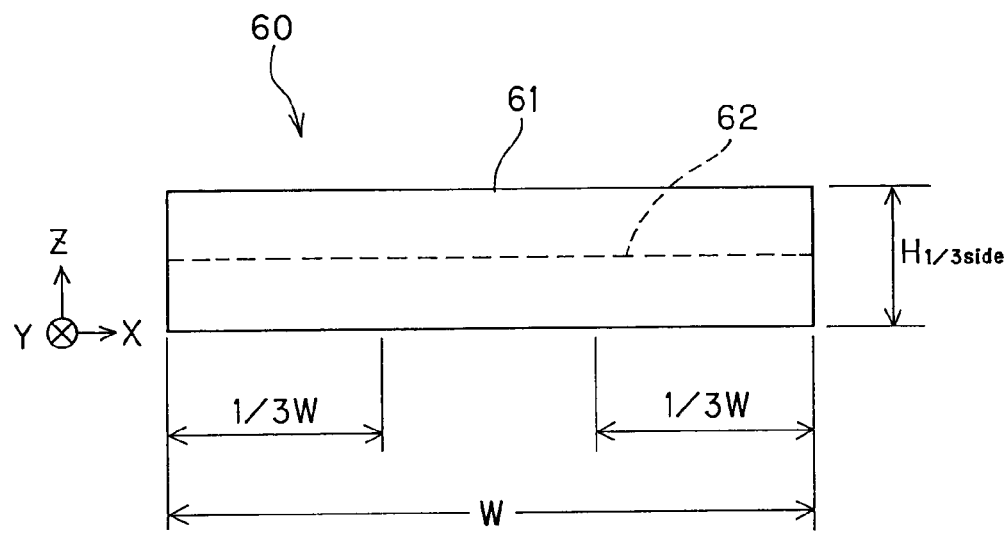

FIGS. 4A and 4B are the simplest, and the most comprehensible, drawings for the structure of the invention.

The write shield layer 60 depicted in FIGS. 4A and 4B comprises a thick-film portion (indicated at 61) that is positioned near the air bearing surface and has a uniform thickness in the widthwise direction and a uniform thin-film portion (indicated at 62) that extends from it to the rear (in the Y-direction in FIG. 4A). This thin-film portion extends a long distance (that accounts for about 70% of the whole length of the write shield layer 60 in the Y-direction).

Here let W be indicative of the full length of the write shield layer 60 lying substantially on the air bearing surface in the widthwise direction, as depicted in FIG. 4B. Then, the write shield layer 60 is set such that when that full length W is trisected, the maximum thickness $H_{1/3side}$ of the write shield layer 60 at both ends in the range of ⅓W size in the widthwise direction is greater than the average thickness $H_m$ of the whole write shield layer from the air bearing surface up to the rear: $H_{1/3side}>H_m$. Since the shape at the air bearing surface position of the write shield layer 60 depicted in FIG. 4B is rectangular, its maximum thickness $H_{1/3side}$ in the range of ⅓W size becomes equal to its thickness at the air bearing surface position. The average thickness $H_m$ of the whole write shield layer may be found by calculating the volume V that the whole write shield layer has and dividing that volume V by the lower area A of the write shield layer (V/A). In this embodiment, $H_m$ is only a bit thicker than the uniform thin-film portion (indicated at 62) due to the presence of the thick-film portion (indicated at 61) as depicted in FIG. 4A, but the relation of $H_{1/3side}>H_m$ is satisfied nonetheless. The value of $H_{1/3side}$ should be in the range of preferably (1.2 to 3.0) $H_m$, and most preferably (1.5 to 2.5) $H_m$. As there is $H_{1/3side} \leq H_m$ departing from the range of the invention, it will cause the magnetic field to tend to concentrate on the ends of the write shield layer with the result that the whole write shield layer will never be slimmed down. This will in turn cause inconveniences such as the vulnerability of the write shield layer, if it is of large size, to an external magnetic field, and the PTP (pole tip protrusion) phenomenon resulting from the o generation of heat from the coils or external temperature changes.

In the write shield layer 60 depicted in FIGS. 4A and 4B, there is the thick-film portion (indicated at 61) that lies at the air bearing surface and extends upward; however, that thick-film portion could extend downward and/or upward. The expression "substantially lying on the air bearing surface" is understood to factor in the provision of a protective film coating or the like to the air bearing surface.

Figure 5A:
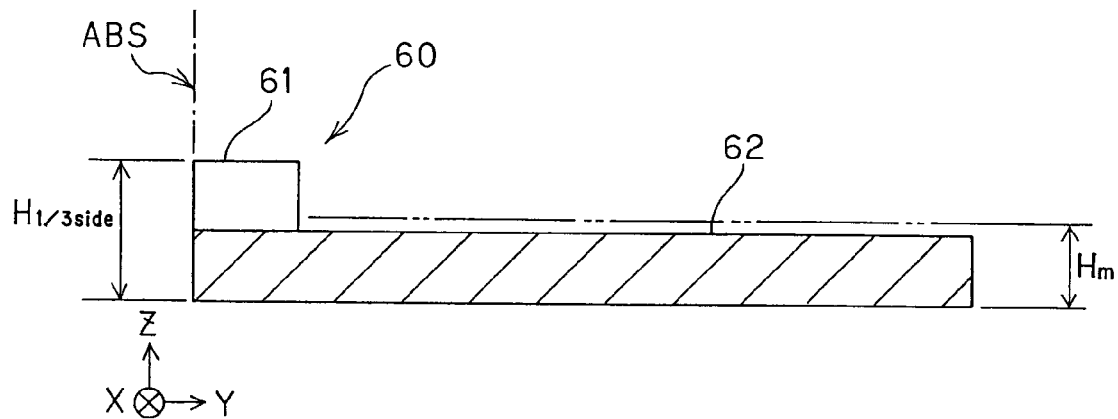
FIGS. 5A and 5B are each illustrative of a specific structure example of the write shield layer.
Figure 5B:
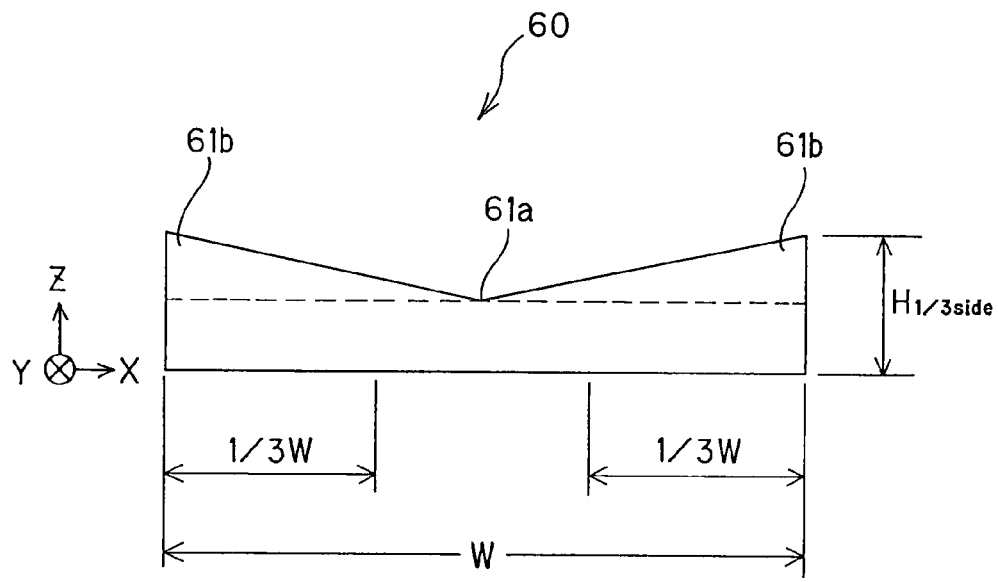

Referring to FIGS. 5A and 5B, the write shield layer 60 comprises a thick-film portion (indicated at 61) whose thickness in the vicinity of the air bearing surface increases gradually from a center 61a to ends 61b in the widthwise direction, as shown in depicted in FIG. 5B, and a uniform thin-film portion (indicated at 62) that extends from it toward the rear side (in the Y-direction in FIG. 5A). That thin-film portion 62 extends a long distance (that accounts for typically about 70% of the full length of the write shield layer 60 in the Y-direction). The thick-film portion (indicated at 61) whose thickness increases gradually from the center 61a to the ends 61b could be in a linear or curved form.

In the embodiment of FIGS. 5A and 5B, too, the $H_{1/3side}$ to $H_m$ relation is set in such a way as to satisfy $H_{1/3side} > H_m$, as described above.

In the write shield layer 60 depicted in FIGS. 5A and 5B, there is the thick-film portion (indicated at 61) that lies at the air bearing surface and extends substantially upward; however, that thick-film portion could extend downward and/or upward.

Figure 6A:
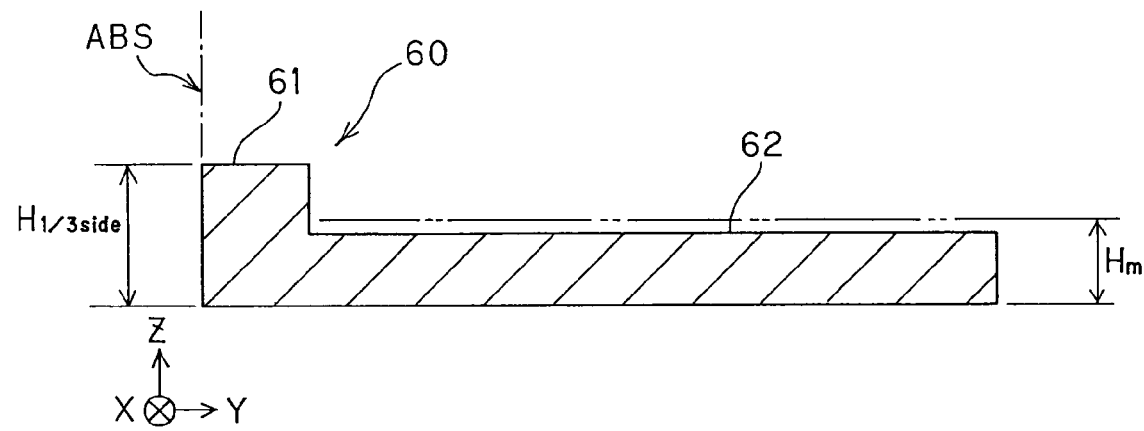
FIGS. 6A and 6B are each illustrative of a specific structure example of the write shield layer.
Figure 6B:
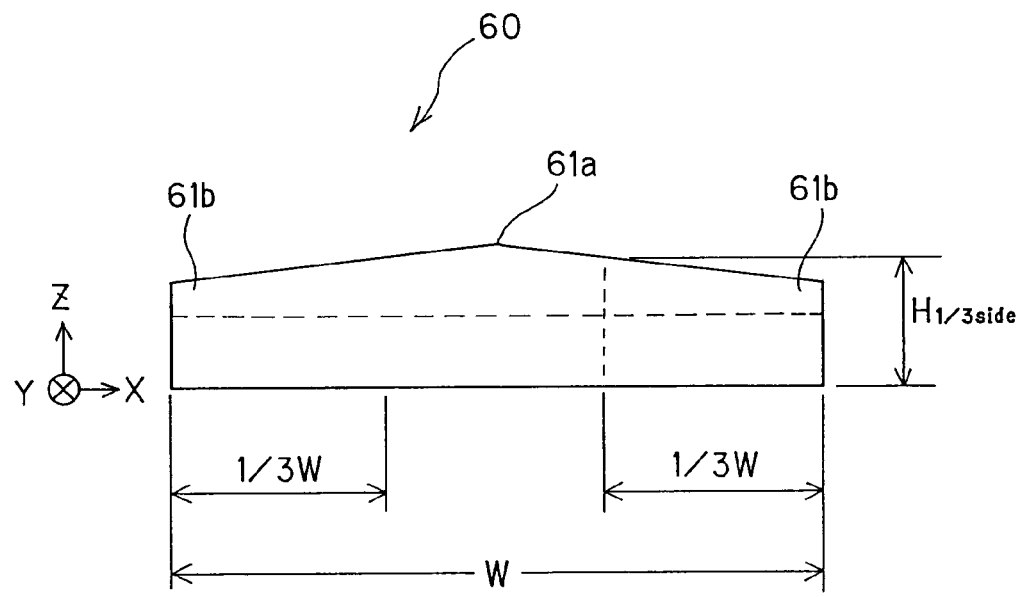

Referring to FIGS. 6A and 6B, the write shield layer 60 comprises a thick-film portion (indicated at 61) whose thickness in the vicinity of the air bearing surface decreases gradually from a center 61a to ends 61b in the widthwise direction, as shown in depicted in FIG. 6B, and a uniform thin-film portion (indicated at 62) that extends from it toward the rear side (in the Y-direction in FIG. 6A). That thin-film portion 62 extends a long distance (that accounts for typically about 70% of the full length of the write shield layer 60 in the Y-direction). The thick-film portion (indicated at 61) whose thickness decreases gradually from the center 61a to the ends 61b could be in a linear or curved form.

In the embodiment of FIGS. 6A and 6B, too, the $H_{1/3side}$ to $H_m$ relation is set in such a way as to satisfy $H_{1/3side} > H_m$, as described above.

In the write shield layer 60 depicted in FIGS. 6A and 6B, there is the thick-film portion (indicated at 61) that lies at the air bearing surface and extends substantially upward; however, that thick-film portion could extend downward and/or upward.

Figure 7A:
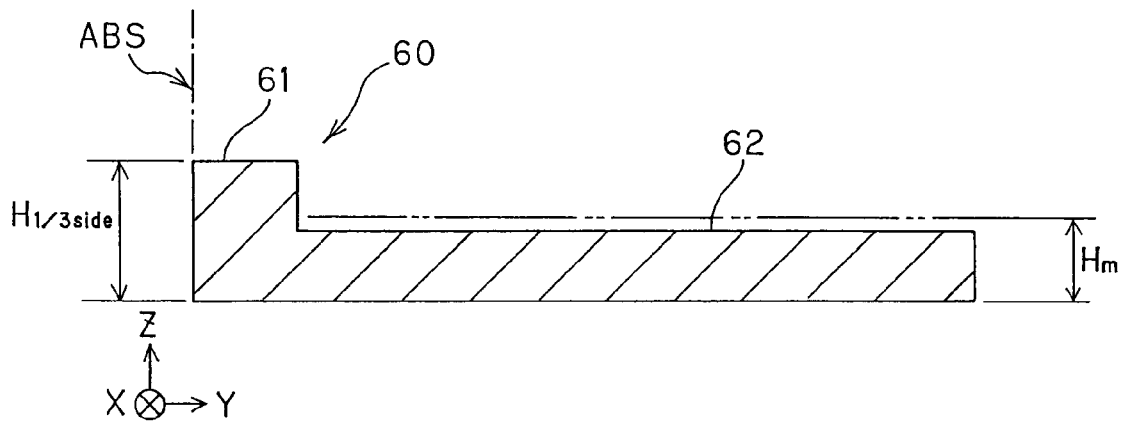
FIGS. 7A and 7B are each illustrative of a specific structure example of the write shield layer.
Figure 7B:
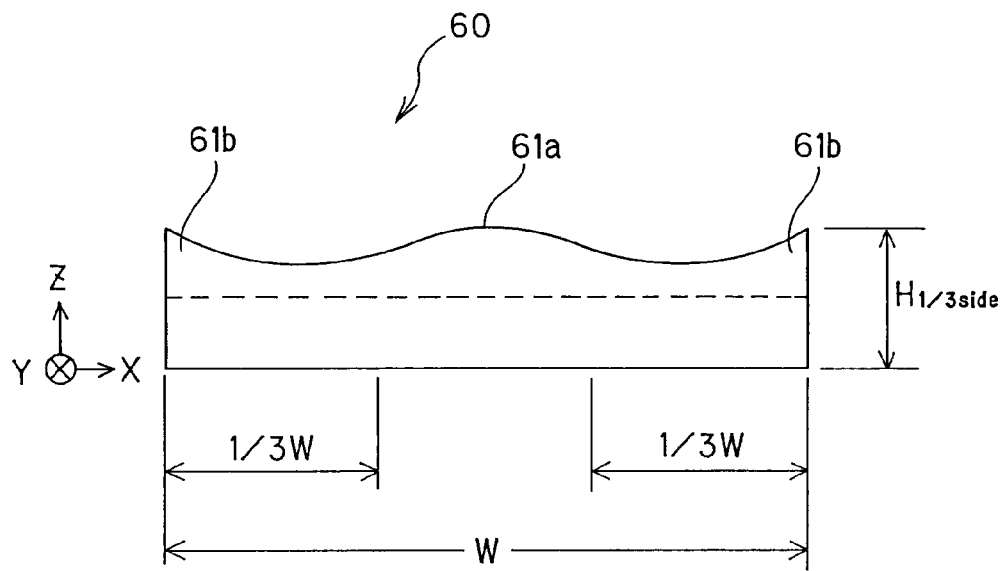

Referring to FIGS. 7A and 7B, the write shield layer 60 comprises a thick-film portion (indicated at 61) whose thickness in the vicinity of the air bearing surface first decreases gradually from a center 61a and then increases gradually toward ends 61b in the widthwise direction, as shown in depicted in FIG. 7B, and a uniform thin-film portion (indicated at 62) that extends from it toward the rear side (in the Y-direction in FIG. 7A). That thin-film portion 62 extends a long distance (that accounts for typically about 70% of the full length of the write shield layer 60 in the Y-direction). The thick-film portion (indicated at 61) whose thickness decreases gradually from the center 61a and increases gradually toward the ends 61b could be in a linear or curved form.

In the embodiment of FIGS. 7A and 7B, too, the $H_{1/3side}$ to $H_m$ relation is set in such a way as to satisfy $H_{1/3side} > H_m$, as described above.

In the write shield layer 60 depicted in FIGS. 7A and 7B, there is the thick-film portion (indicated at 61) that lies at the air bearing surface and extends substantially upward; however, that thick-film portion could extend downward and/or upward.

Figure 8A:
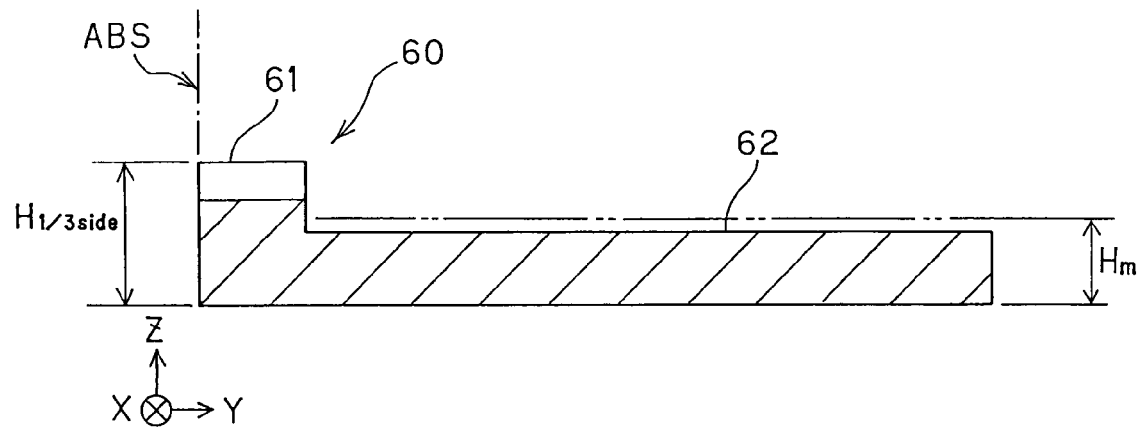
FIGS. 8A and 8B are each illustrative of a specific structure example of the write shield layer.
Figure 8B:
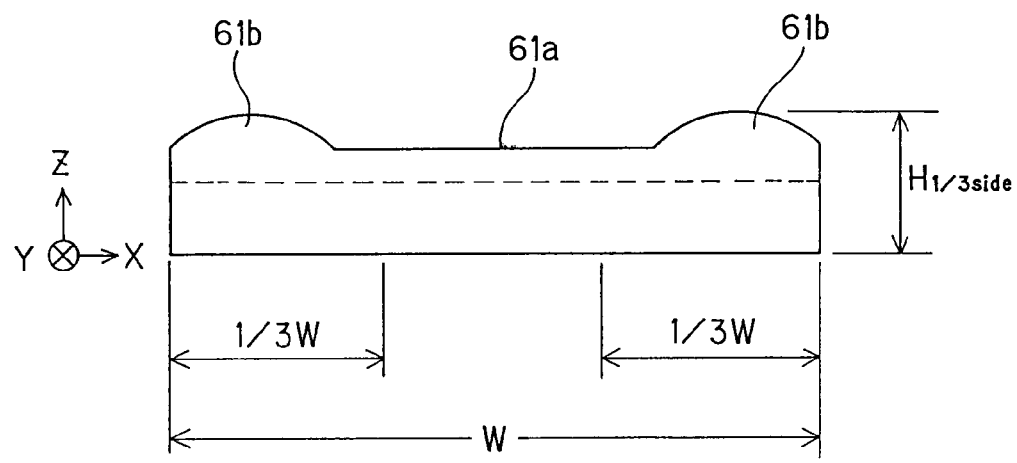

Referring to FIGS. 8A and 8B, the write shield layer 60 comprises a thick-film portion (indicated at 61) whose thickness in the vicinity of the air bearing surface is substantially even at a center 61a and which has curved rises near both ends 61b only, as shown in depicted in FIG. 8B, and a uniform thin-film portion (indicated at 62) that extends from it toward the rear side (in the Y-direction in FIG. 8A). That thin-film portion 62 extends a long distance (that accounts for typically about 70% of the full length of the write shield layer 60 in the Y-direction).

In the embodiment depicted in FIGS. 8A and 8B, too, the $H_{1/3side}$ to $H_m$ relation is set in such a way as to satisfy $H_{1/3side} > H_m$, as described above.

In the write shield layer 60 depicted in FIGS. 8A and 8B, there is the thick-film portion (indicated at 61) that lies at the air bearing surface and extends substantially upward; however, that thick-film portion could extend downward and/or upward.

Figure 9A:
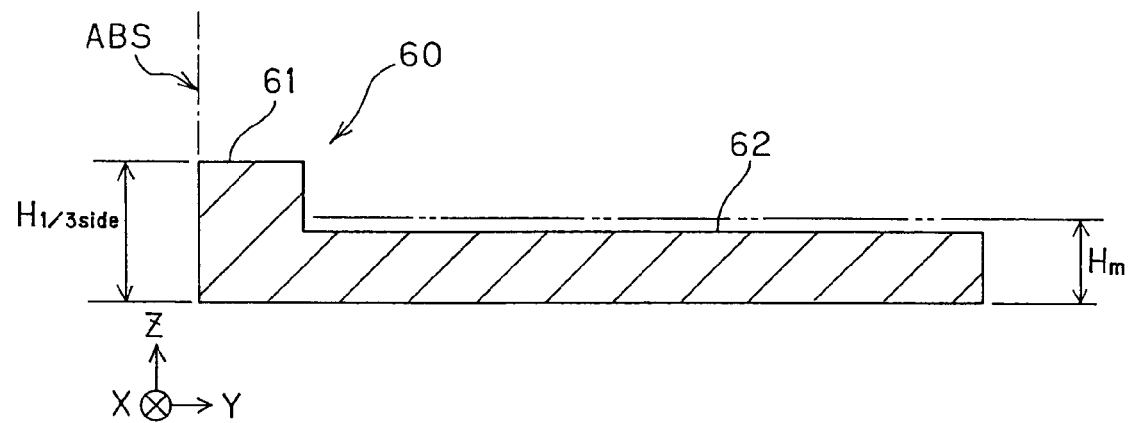
FIGS. 9A and 9B are each illustrative of a specific structure example of the write shield layer.
Figure 9B:
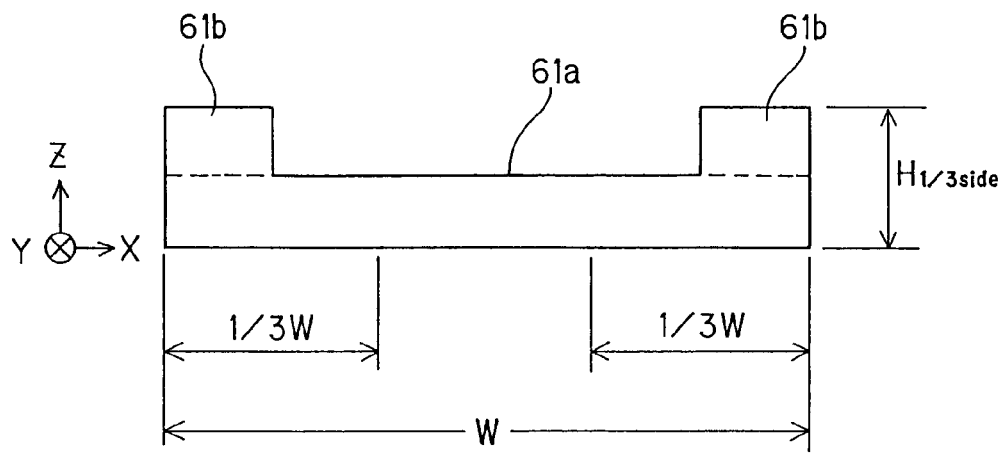

Referring to FIGS. 9A and 9B, the write shield layer 60 comprises a thick-film portion (indicated at 61) whose thickness in the vicinity of the air bearing surface is substantially even at a center 61a and which has rectangular rises near both ends 61b alone, as shown in depicted in FIG. 9B, and a uniform thin-film portion (indicated at 62) that extends from it to the rear side (in the Y-direction in FIG. 9A). That thin-film portion 62 extends a long distance (that accounts for typically about 70% of the full length of the write shield layer 60 in the Y-direction).

In the embodiment depicted in FIGS. 9A and 9B, too, the $H_{1/3side}$ to $H_m$ relation is set in such a way as to satisfy $H_{1/3side} > H_m$, as described above.

In the write shield layer 60 depicted in FIGS. 9A and 9B, there is the thick-film portion (indicated at 61) that lies at the air bearing surface and extends substantially upward; however, that thick-film portion could extend downward and/or upward.

Figure 10:
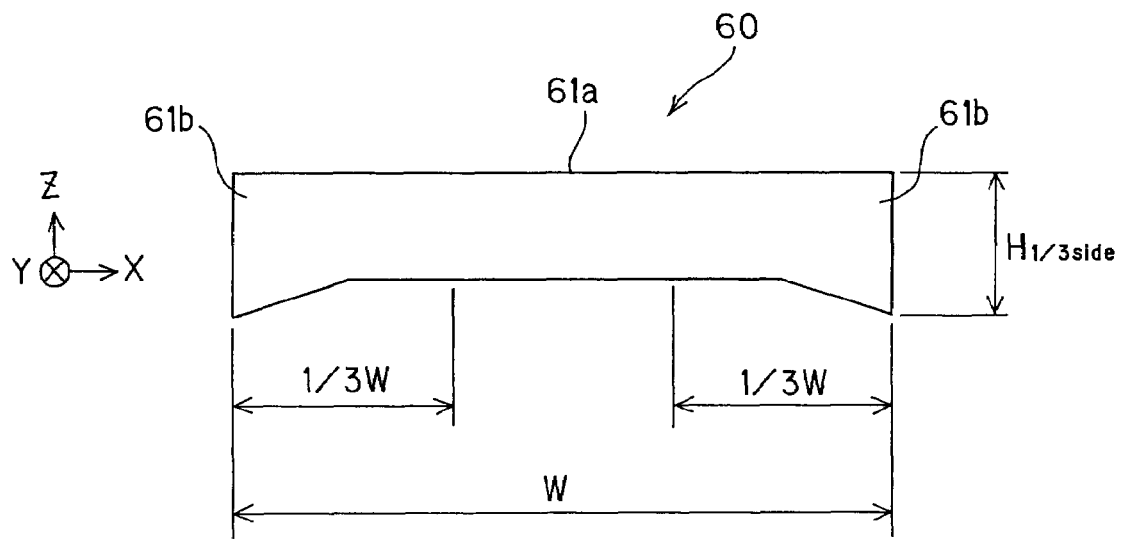
FIG. 10 is illustrative in X-Z plane of the form of the air bearing surface (ABS) on the write shield layer.
Figure 11:
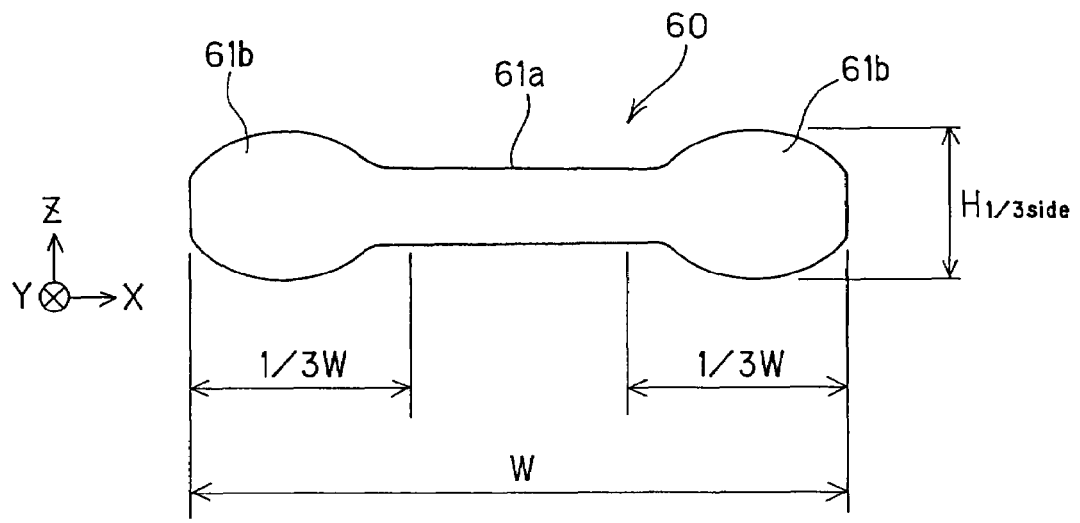
FIG. 11 is illustrative in X-Z plane of the form of the air bearing surface (ABS) on the write shield layer.

FIGS. 10 and 11 are each illustrative on the X-Z plane of the form of the air bearing surface (ABS) in the preferable write shield layer 60, corresponding to FIGS. 4B to 9B. In the morphologies depicted in FIGS. 10 and 11, too, the $H_{1/3side}$ to $H_m$ relation is set in such a way as to satisfy $H_{1/3side} > H_m$, as described above.

The structure of part of the invention as explained above could be achieved by making some contrivance to the stacking technique, figuring out tweaks to the multilayer film structure while taking care of the "run-on" polishing position as far as the air bearing surface, or the like.

Preferred fabrication examples 1 to 5 are now explained with reference to FIGS. 12 to 16.

Fabrication Example 1

Figures 12A, 12B:
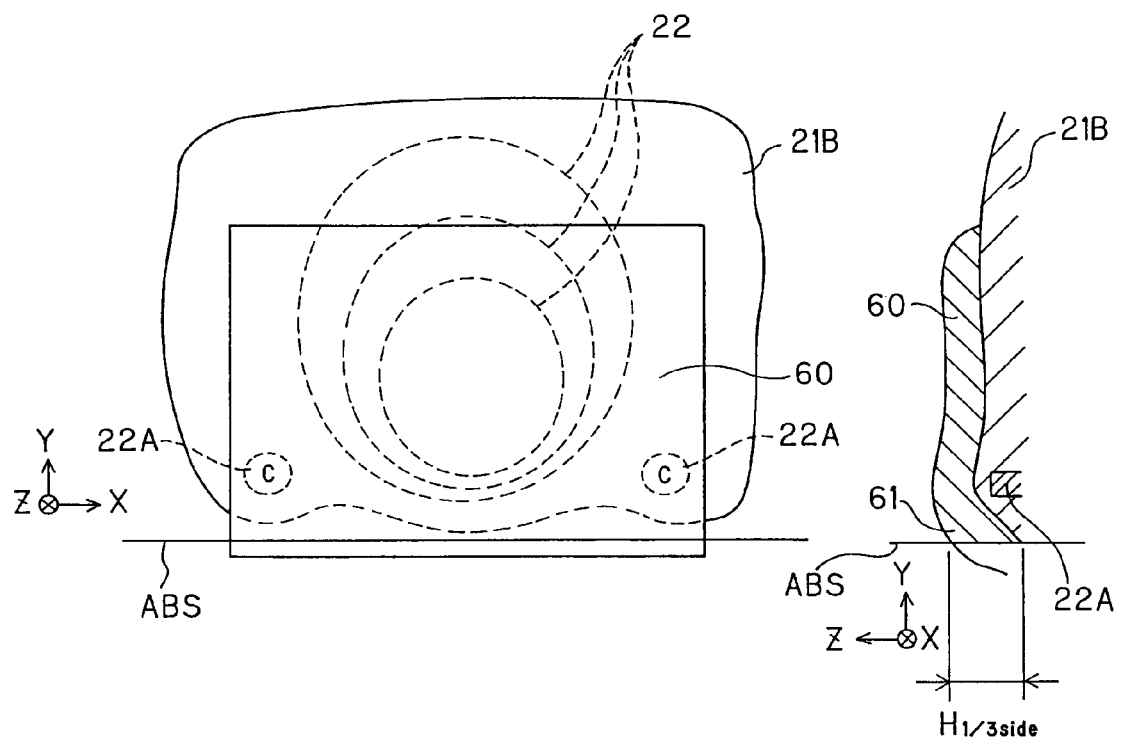
FIG. 12A is a Y-X plan view of the write shield layer upon formation.
FIG. 12B is a Y-Z sectional view of the write shield layer upon formation.

FIG. 12A is illustrative on the Y-X plane of the write shield layer on formation; FIG. 12B is illustrative in the Y-Z section of the write shield layer on formation; and FIG. 12C is an X-Z front view of the air bearing surface, representative mainly of the write shield layer and the magnetic pole layer.

Figure 12C:
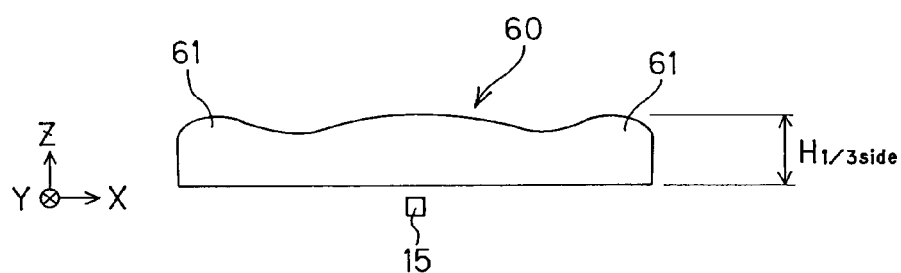
FIG. 12C is an X-Z front view of the air bearing surface, representative mainly of the write shield layer and the magnetic pole layer.

Bottom spacer layer pieces 22A, each made of the same material as the magnetic flux-generating thin-film coil 22 (not shown in FIG. 12B) are spotted beforehand, so that upon the formation of that coil 22, both ends of the write shield layer 60 to be formed later can be put up in the vicinity of the air bearing surface, as depicted in FIGS. 12A-12C.

Thereafter, the insulating film 21B is formed, and the write shield layer 60 is formed on that insulating film 21B, whereupon in a "run-on" polishing position as far as the air bearing surface (indicated by a line ABS), the write shield layer 60 is provided at both its ends with thick-film portions 61, each being typically in a hunch form. Such a fabrication technique, because of enabling the thin-film coil 22 to be formed simultaneously with the formation of the bottom spacer pieces 22A made of the same material as it, has huge merits in view of both a material aspect and a common, simplified process aspect.

Fabrication Example 2

Figures 13A, 13B:
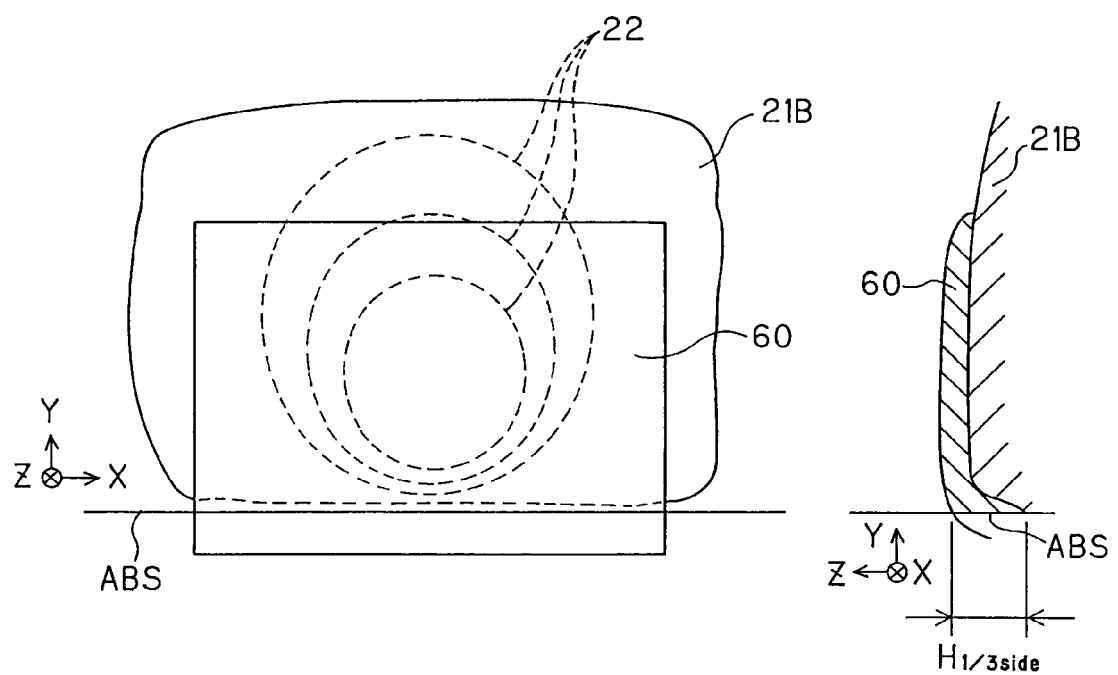
FIG. 13A is a Y-X plan view of the write shield layer upon formation.
FIG. 13B is a Y-Z sectional view of the write shield layer upon formation.

FIG. 13A is illustrative on the Y-X plane of the write shield layer on formation; FIG. 13B is illustrative in the Y-Z section of the write shield layer on formation; and FIG. 13C is an X-Z front view of the air bearing surface, representative mainly of the write shield layer and the magnetic pole layer.

Figure 13C:
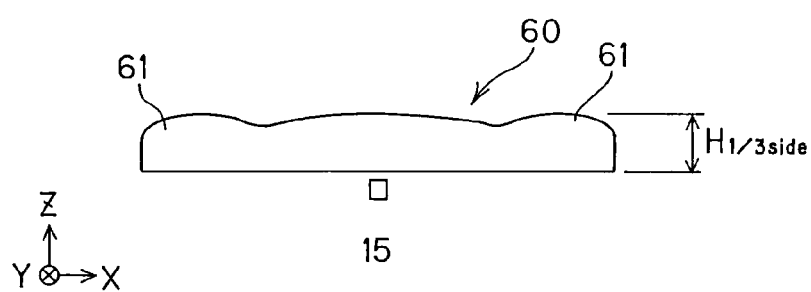
FIG. 13C is an X-Z front view of the air bearing surface, representative mainly of the write shield layer and the magnetic pole layer.

After the formation of the magnetic flux-generating thin-film coil 22 (not shown in FIG. 13B), the insulating film 21B is formed in such a way as to cover that thin-film coil 22, as depicted in FIGS. 13A-13C. The form and location of the insulating film 21B here are experimentally determined beforehand, so that upon formation of the insulating film 21B, thick-film portions 61 can be formed at both ends near the air bearing surface of the write shield layer 60 to be formed later.

After the formation of the insulating film 21B capable of meeting that purpose, the write shield layer 60 is formed on that insulating film 21B, whereupon in a "run-on" polishing position as far as the air bearing surface (indicated by a line ABS), the write shield layer 60 is provided at both its ends with thick-film portions 61, each being typically in a hunch form. For such a fabrication technique, there is only the need of forming the insulating layer 21B according to the specifications determined experimentally beforehand in term of form and location. By doing so, the write shield layer 60 as desired herein can be formed with no modification, and no addition, to the process.

Fabrication Example 3

FIG. 14A is illustrative on the Y-X plane of the write shield layer on formation; FIG. 14B is illustrative in the Y-Z section of the write shield layer on formation; and FIG. 14C is an X-Z front view of the air bearing surface, representative mainly of the write shield layer and the magnetic pole layer.

After the formation of the magnetic flux-generating thin-film coil 22 (not shown in FIG. 14B), insulating film pieces 21B' functioning as a bottom spacer layer and made of the same material as the insulating film 21B are spotted beforehand, so that upon formation of the insulating film 21B in such a way as to cover the thin-film coil 22, both ends of the write shield layer 60 to be formed later can be put up near the air bearing surface, as depicted in FIGS. 14A-14C. In other words, a part (as illustrated) or the whole of the insulating film pieces 21B' is formed near the ABS and beneath both ends of the write shield layer 60. Thereafter, the write shield layer 60 is formed on the insulating film 21B in such a way as to cover a part or the whole of the insulating film pieces 21B'.

Thereupon, in a "run-on" polishing position as far as the air bearing surface (indicated by a line ABS), the write shield layer 60 is provided at both its ends with thick-film portions 61, each being typically in a hunch form. Such a fabrication technique, because of enabling the insulating film 21b to be formed simultaneously with the formation of the insulating film pieces 21B' of the same material (functioning as the bottom spacer layer), has huge merits in view of both a material aspect and a common, simplified process aspect.

Fabrication Example 4

Figure 15A:
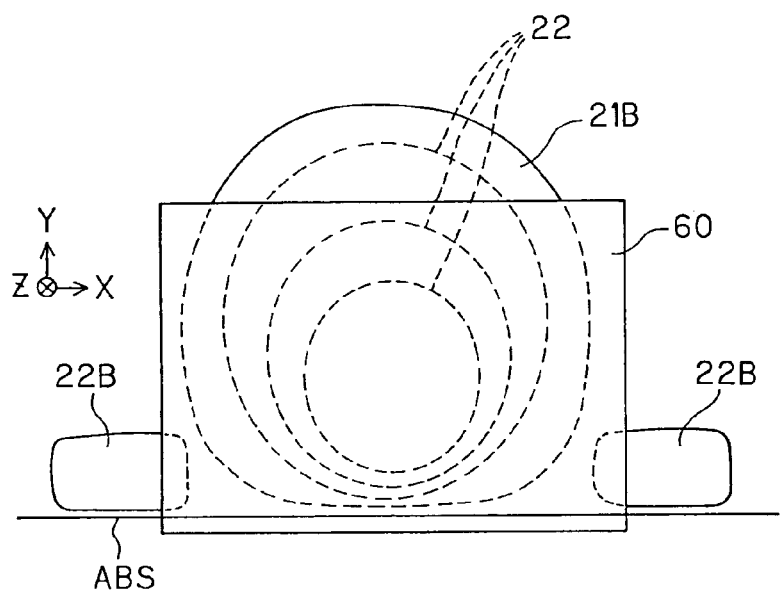
FIG. 15A is a Y-X plan view of the write shield layer upon formation.
Figure 15B:
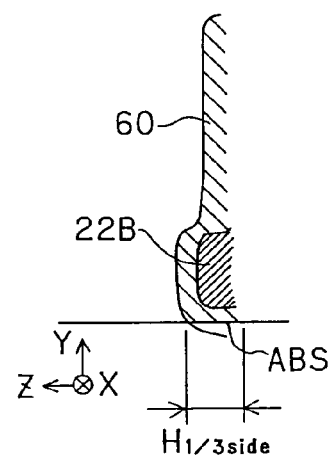
FIG. 15B is a Y-Z sectional view of the write shield layer upon formation.

FIG. 15A is illustrative on the Y-X plane of the write shield layer on formation; FIG. 15B is illustrative in the Y-Z section of the write shield layer on formation; and FIG. 15C is an X-Z front view of the air bearing surface, representative mainly of the write shield layer and the magnetic pole layer.

Figure 15C:
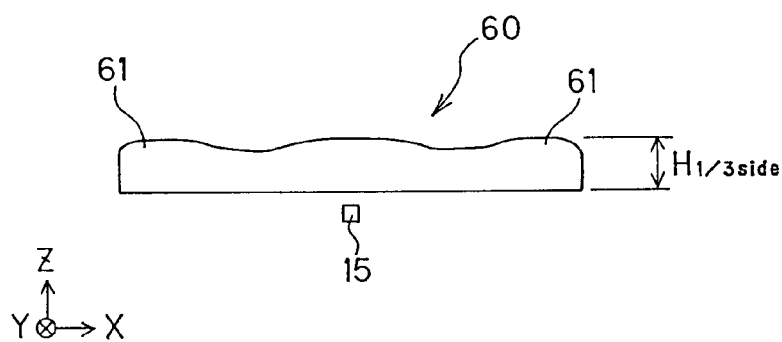
FIG. 15C is an X-Z front view of the air bearing surface, representative mainly of the write shield layer and the magnetic pole layer.

Bottom spacer layer pieces 22B made of the same material as the magnetic flux-generating thin-film coil 22 (not shown in FIG. 15(B)) are spotted beforehand, so that upon formation of the thin-film coil 22, both ends of the write shield layer 60 to be formed later can be put up near the air bearing surface, as depicted in FIGS. 15A-15C. In other words, a part (as illustrated) or the whole of the bottom spacer layer pieces 22B is formed near the ABS and beneath both ends of the write shield layer 60.

Thereafter, the write shield layer 60 is formed on the insulating film 21B in such a way as to cover a part or the whole of the bottom spacer layer pieces 22B.

Thereupon, in a "run-on" polishing position as far as the air bearing surface (indicated by a line ABS), the write shield layer 60 is provided at both its ends with thick-film portions 61, each being typically in a hunch form. Such a fabrication technique, because of enabling the thin-film coil 22 to be formed simultaneously with the formation of the space layer pieces 22B made of the same material, has huge merits in view of both a material aspect and a common, simplified process aspect.

It is noted that the bottom spacer layer pieces 22B in Fabrication Example 4 differ from the bottom spacer layer 22A in Fabrication Example 1 in that they are directly covered by the write shield layer 6, rather than by the insulating film 21B.

Fabrication Example 5

Figures 16A, 16B:
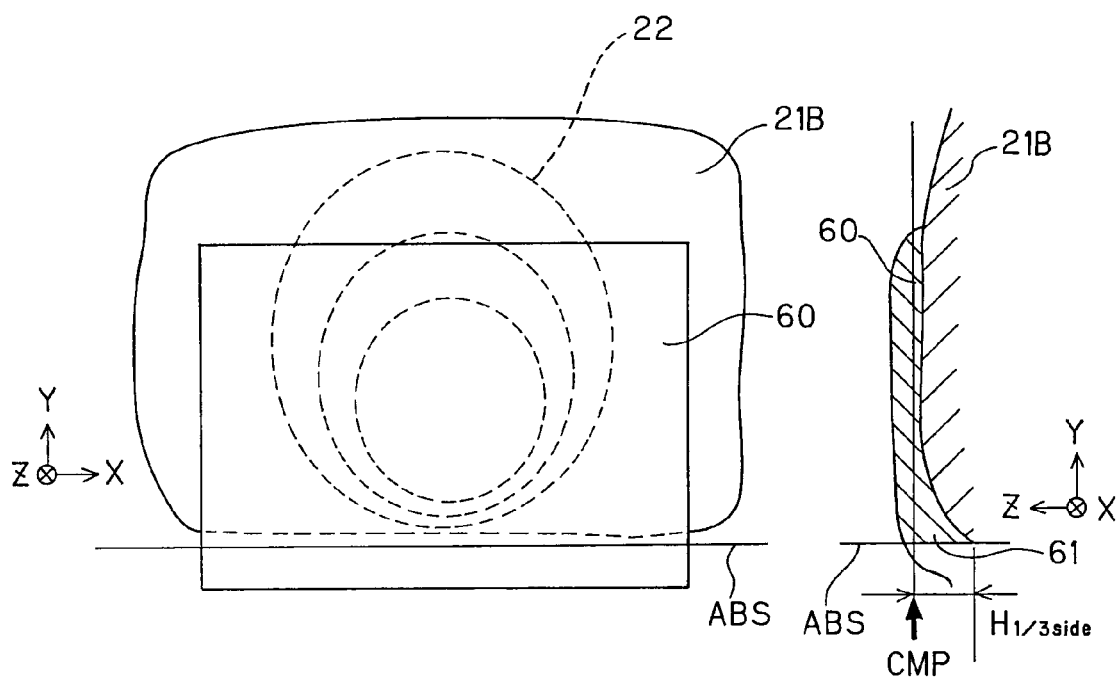
FIG. 16A is a Y-X plan view of the write shield layer upon formation.
FIG. 16B is a Y-Z sectional view of the write shield layer upon formation.
Figure 16C:
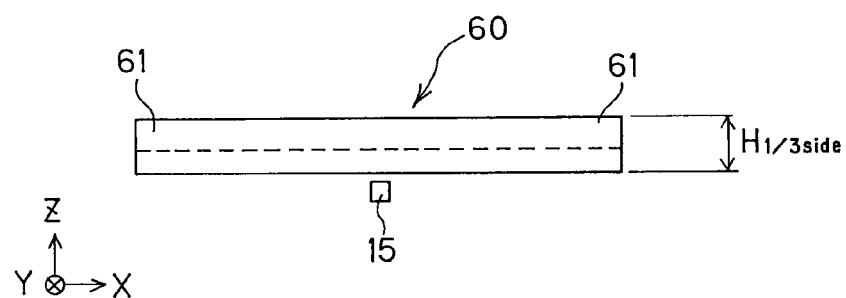
FIG. 16C is an X-Z front view of the air bearing surface, representative mainly of the write shield layer and the magnetic pole layer.

FIG. 16A is illustrative on the Y-X plane of the write shield layer on formation; FIG. 16B is illustrative in the Y-Z section of the write shield layer on formation; and FIG. 16C is an X-Z front view of the air bearing surface, representative mainly of the write shield layer and the magnetic pole layer.

Fabrication Example 5 is a modification to the above Fabrication Example 2.

After the formation of the magnetic flux-generating thin-film coil 22 (not shown in FIG. 16B), the insulating film 21B is formed so that the whole portion or both ends of the write shield layer 60 to be formed later, near the air bearing surface, is provided with a thick-film portion or portions, as depicted in FIGS. 15A-15C. In other words, the formation of the insulating film 21B is contrived such that its part functions as a preferable bottom spacer layer for the write shield layer 60.

In short, the insulating layer 21B is configured in such a shape as to function as a bottom spacer layer while taking the coating technique, the curing technique, the selection of material, etc. into account. Then, the write shield layer 60 is formed on the insulating film 21B. Thereafter, the write shield layer 60 is flattened by CMP, as indicated by a CMP line in FIG. 16B, whereupon, in a "run-on" polishing position as far as the air bearing surface (indicated by a line ABS), the thick-film portion 61 is formed on the air bearing surface of the write shield layer 60.

Possible other fabrication embodiments, although they are somewhat complicated processes, involve (1) forming as a bottom spacer layer a thick electrode film beneath both ends of the write shield layer 60 near the air bearing surface, and (2) controlling a plating rate to contrive the frame shape of frame plating in such a way as to form a thick-film portion at a given position, so that both ends of the write shield layer 60 near the air bearing surface can be put up.

In the thin-film magnetic head comprising a recording head portion adapted to record magnetic information in a recording medium, the first feature of the invention lies in the structure of the write shield layer 60 joined to the magnetic pole layer 40 to form part of the recording head portion. In other words, the crucial feature of the invention is that a lot more thickness is applied to both ends of the write shield layer 60 in the widthwise direction of the air bearing surface, thereby preventing concentration of an external magnetic field on those ends to improve on the external magnetic field resistance. Such a structure is also preferably applied to an assembly of upper and lower magnetic shield layers (the upper read shield layer 30 and the lower read shield layer 3) located with a read-only magneto-resistive effect device 8 held between them for the purpose of having a magnetic shield action to it. Note here that the upper 30 and the lower read shield layer 3 could be each in either a single-layer film form or a multilayer film form.

That is, in a thin-film magnetic head comprising a reproducing head portion 100A adapted to reproduce magnetic information recorded in a recording medium, the reproducing head portion 100A comprises a magneto-resistive effect device 8, and an upper read shield layer 30 and a lower read shield layer 3 located above and below the magneto-resistive effect device 8 to isolate it magnetically from the surroundings. The upper 30 and the lower read shield layer 3 each extend from a surface toward the rear, wherein said surface is opposite to the recording medium that moves in a medium traveling direction. Here let Wup and Wdn be indicative of the full length of the upper 30 and the lower read shield layer 3 lying substantially on the air bearing surface opposite to the recording medium in the widthwise direction. Then, the upper read shield layer 30 is determined such that when that full length Wup is trisected, the average thickness $Hup_{1/3side}$ of the upper read shield layer 30 at both its ends in the range of widthwise ⅓Wup size is larger than the average thickness $Hup_m$ of the whole upper read shield layer 30 extending from the air bearing surface up to the rear: $Hup_{1/3side} > Hup_m$. Likewise, the lower read shield layer 3 is determined such that when that full length Wdn is trisected, the average thickness $Hdn_{1/3side}$ of the lower read shield layer 3 at both its ends in the range of widthwise ⅓Wdn size is larger than the average thickness $Hdn_m$ of the whole lower read shield layer 3 extending from the air bearing surface up to the rear: $Hdn_{1/3side} > Hdn_m$. Specific embodiments are similar to those of FIGS. 4-11, and see them.

Explanation of the Head Gimbal Assembly and the Hard Disk System

The head gimbal assembly and the hard disk system according to the embodiment of the invention are now explained.

A slider 210 included in the head gimbal assembly is first explained with reference to FIG. 17. In the hard disk system, the slider 210 is located in such a way as to face a hard disc that is a rotationally driven disk-form recording medium. This slider 210 primarily comprises a substrate 211 composed of a substrate member 1 and an overcoat 24 depicted in FIG. 1.

The substrate 211 is in a generally hexahedral shape. Of the six surfaces of the substrate 211, one surface (the upper one in FIG. 17) is in opposition to the hard disk. On that one surface there is formed an air bearing surface 70.

Figure 17:
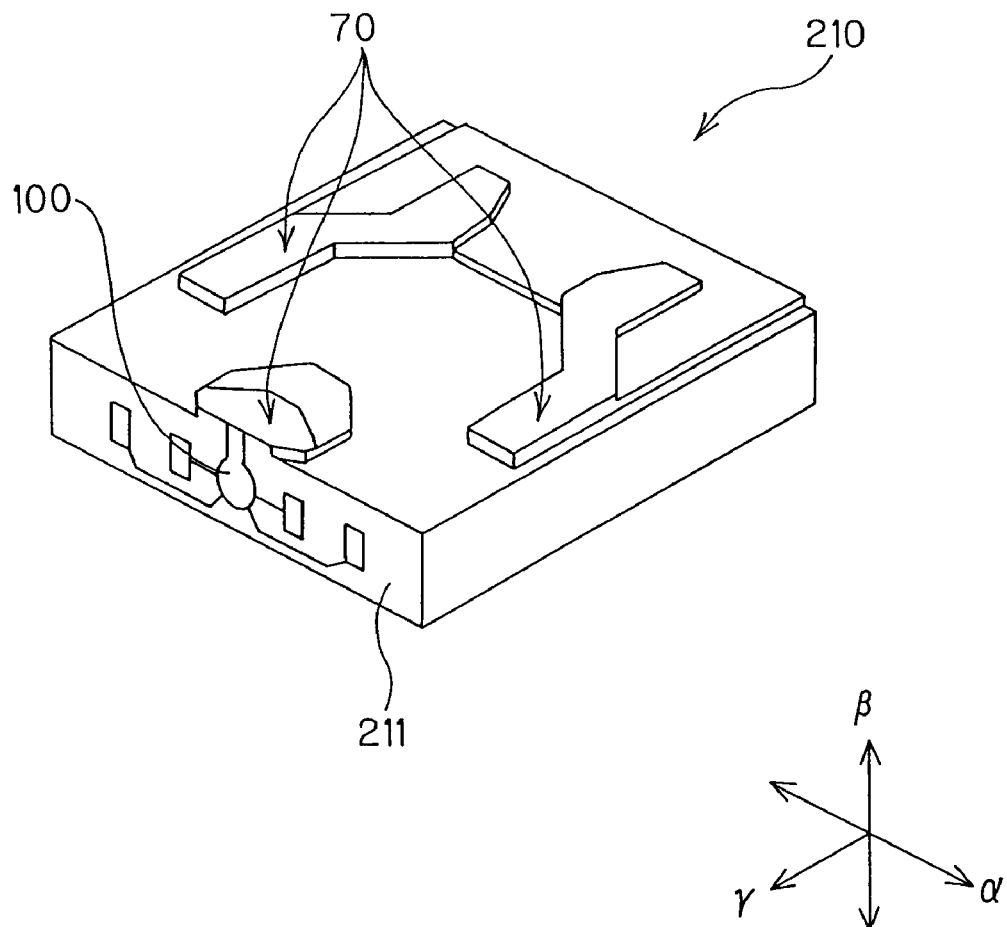
FIG. 17 is illustrative in perspective of the slider included in the head gimbal assembly according to one embodiment of the invention.

As the hard disk rotates in the y-direction in FIG. 17, it causes an air flow passing between the hard disk and the slider 210 to induce lift relative to the slider 210 in the downward β-direction in FIG. 17. This lift in turn causes the slider 210 to levitate over the surface of the hard disk. Note here that the α-direction in FIG. 17 traverses tracks on the hard disk.

Near the end of the slider 210 on an air exit side (the left lower end in FIG. 17), there is the thin-film magnetic head formed according to the invention.

A head gimbal assembly 220 according to this embodiment is now explained with reference to FIG. 18. The head gimbal assembly 220 comprises a slider 210 and a suspension 221 adapted to resiliently support that slider 210. The suspension 221 comprises a leaf spring-form load beam 222 formed typically of stainless steel, a flexure 223 attached to one end of the load beam 222 and having the slider 210 joined to it for giving a suitable degree of flexibility to the slider 210, and a base plate 224 attached to the other end of the load beam 222.

The base plate 224 is adapted to be attached to an arm 230 of an actuator for moving the slider 210 in the track traverse direction α of the hard disk 262. The actuator comprises the arm 230 and a voice coil motor for driving that arm 230. At a portion of the flexure 223 having the slider 210 attached to it, there is a gimbal portion provided for keeping the posture of the slider 210 constant.

The head gimbal assembly 220 is attached to the arm 230 of the actuator. The head gimbal assembly 220 attached to one arm 230 is called a head arm assembly, whereas the head gimbal assembly 220 attached to a carriage at its plurality of arms is referred to as a head stack assembly.

Figure 18:
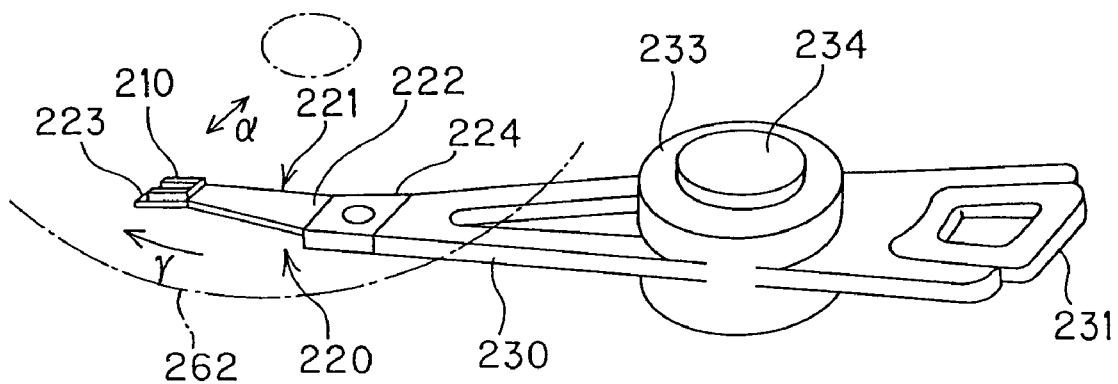
FIG. 18 is illustrative in perspective of the head assembly including the head gimbal assembly according to one embodiment of the invention.

FIG. 18 illustrates one example of the head arm assembly, wherein the head gimbal assembly 220 is attached to one end of the arm 230. To the other end of the arm 230, a coil 231 forming a part of the voice coil motor is attached. Halfway across the arm 230, there is provided a bearing portion 233 attached to a shaft 234 adapted to support the arm 230 in a pivotal fashion.

One example of the head stack assembly and the hard disk system according to the instant embodiment are now explained with reference to FIGS. 19 and 20.

Figure 19:
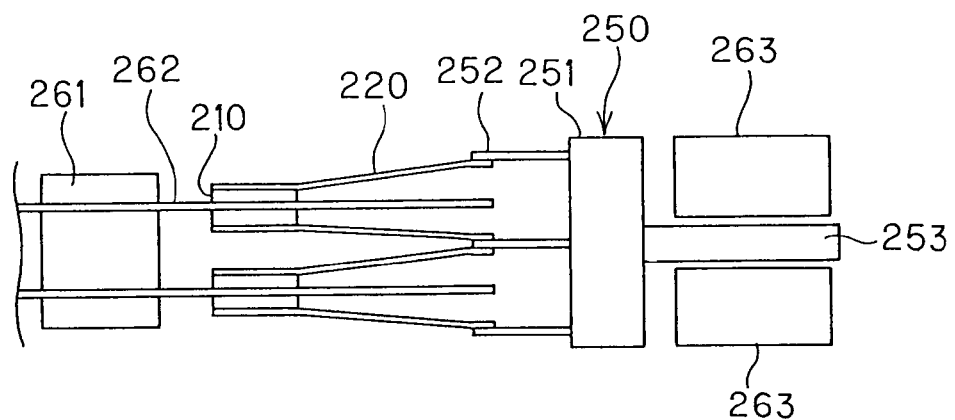
FIG. 19 is illustrative of part of the hard disk system according to one embodiment of the invention.
Figure 20:
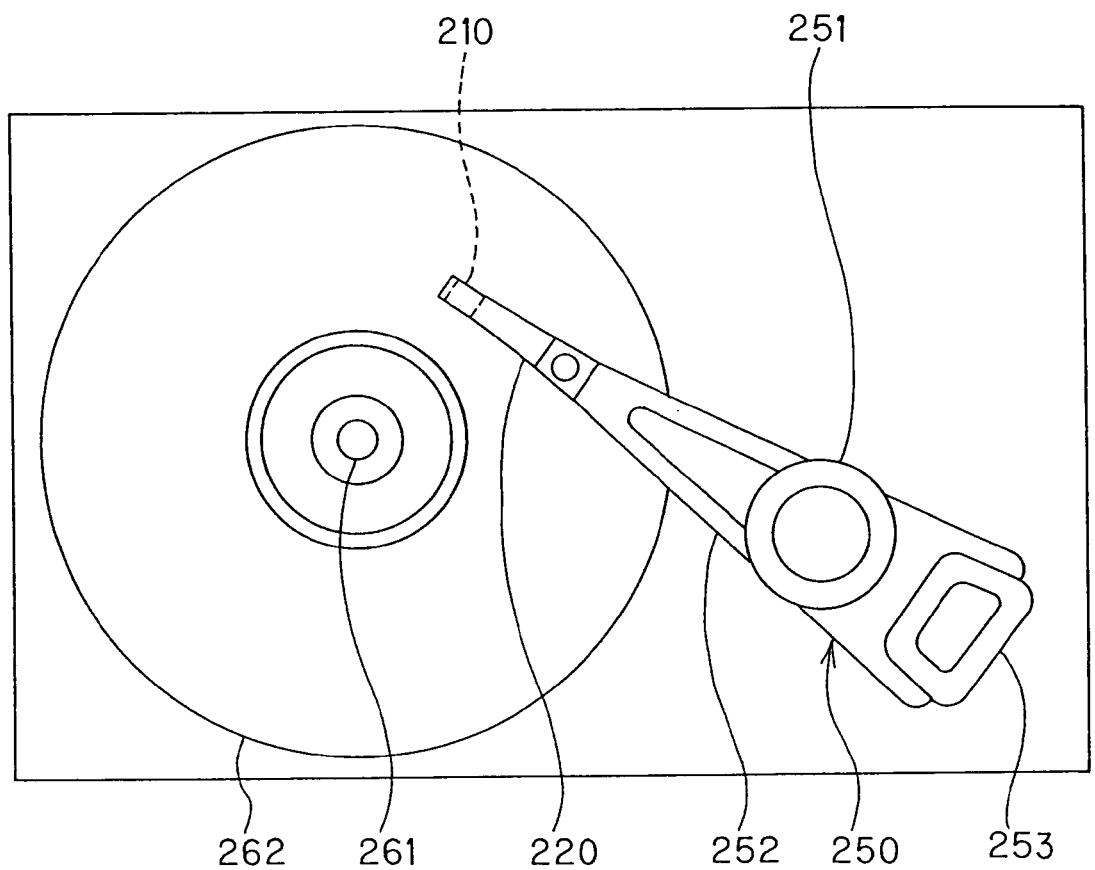
FIG. 20 is a plan view of the hard disk system according to one embodiment of the invention.

FIG. 19 is illustrative of part of the hard disk system, and FIG. 20 is a plan representation of the hard disk system.

A head stack assembly 250 comprises a carriage 251 having a plurality of arms 252. The plurality of arms 252 are provided with a plurality of the head gimbal assemblies 220 such that they line up vertically at an interval. On the side of the carriage 251 that faces away from the arms 252, there is a coil 253 attached, which coil becomes a part of the voice coil motor. The head stack assembly 250 is incorporated in the hard disk system.

The hard disk system comprises a plurality of hard disks 262 attached to a spindle motor 261. For each hard disk 262, two sliders 210 are located such that they are opposite to each other with the hard disk 262 held between them. The voice coil motor has also permanent magnets 263 located at opposite positions with the coil 253 of the head stack assembly 250 held between them.

The head stack assembly 250 except the slider 210 and the actuator correspond to the positioning device herein which is operable to support the slider 210 and position it relative to the hard disk 262.

With the hard disk system here, the actuator is actuated to move the slider 210 in the track traverse direction of the hard disk 272, thereby positioning the slider 210 with respect to the hard disk 262. The thin-film magnetic head incorporated in the slider 210 works such that information is recorded by a recording head in the hard disk 262, and the information recorded in the hard disk 262 is reproduced by a reproducing head.

The head gimbal assembly and the hard disk system here have pretty much the same action as the thin-film magnetic head according to the foregoing embodiment.

While the embodiment here has been described with reference to the thin-film magnetic head of the structure wherein the reproducing head is located on the substrate side and the recording head is stacked on the reproducing head, it is understood that that order of stacking could be reversed. When the thin-film magnetic head here is used as a read-only head, the recording head could be removed from it.

The construction and advantages of the thin-film magnetic head according to the invention are now explained in more details with reference to some experimental examples.

Experimental Example 1

In the thin-film magnetic head as set forth with reference to FIGS. 1-3, the write shield layer 60 was structurally configured as depicted in FIG. 9 (Invention). This write shield layer 60 has the following specific specifications.

Specifications of Inventive Write Shield Layer 60
  Material: $Ni_{80}Fe_{20}$
  $H_{1/3side}$: 3.4 µm
  $H_m$: 1.3 µm Specifications of Comparative Write Shield Layer 60

Figure 22:
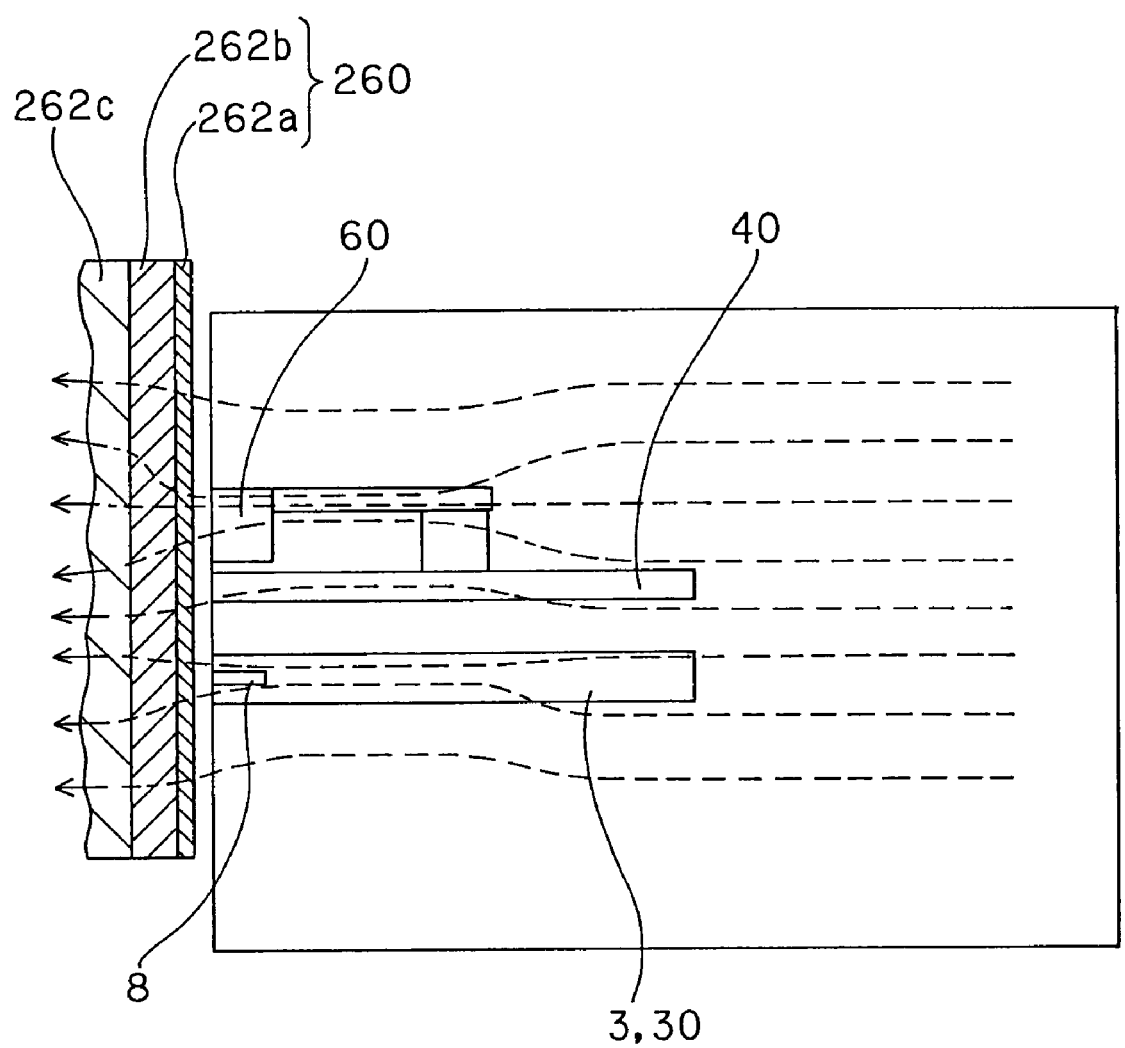
FIG. 22 is illustrative in schematic of the locations of a medium and a thin-film magnetic head in a specific experimental example of the invention.

For a comparison with the invention, a comparative sample with no thick-film portions 61 formed at both ends of the air bearing surface of the write shield layer was prepared as a comparative example. That is, a plate-form comparative sample having only the uniform thin-film portion of FIG. 9A (indicated at 62) was prepared with the following specifications.
  Material: $Ni_{80}Fe_{20}$
  $H_{1/3side}$: 1.3 µm
  $H_m$: 1.3 µm Such inventive and comparative samples were used to find the distribution of areas magnetized in the same quantity of magnetization at both ends of the air bearing surface of the write shield layer 60 on the basis of the position of the medium 260 (hard disk 260) located as depicted in FIG. 22 and the conditions set as mentioned below. In another parlance, the distribution of equal-magnetization-quantity curves was found.

Setting of the Conditions

The magnetic field attributable to demagnetization due to an external magnetic field is affected by, let alone the writer and reader, the distance of the medium up to the so-called lining layer 262b (the soft magnetic underlay layer 262b provided on the underside of the perpendicular magnetic recording layer 262a), and the thickness and saturation magnetic flux density Bs of the lining layer. In FIG. 22, note that a group of dotted-line streams running from right to left is schematically illustrative of magnetic flux flows. As depicted in FIG. 22, the magnetic fluxes concentrate on the air bearing surface of the write shield layer 60 and the air bearing surface of the read shield layer 3, 30. Reference numeral 262c is indicative of the substrate.

Mentioned below are the conditions such as mediums set for the calculations here.
  Direction of the External Magnetic Field: Perpendicular to the medium
  Intensity of the External Magnetic Field: 4,000 (A/m)
  Saturation Magnetic Flux Density of the Medium Lining Layer Bs: 1.0 (T)
  Thickness of the Medium Lining Layer: 180 (nm)
  Distance between the Head and the Medium Lining Layer: 50 (nm) from the ABS
  Position for Calculation: Position from the ABS 20-nm near to the medium side Under these conditions, the distribution of areas magnetized in the same magnetization quantity at both ends of the air bearing surface of the write shield layer was found by simulation. The results are shown in FIGS. 21A and 21B, respectively.

Figure 21B:
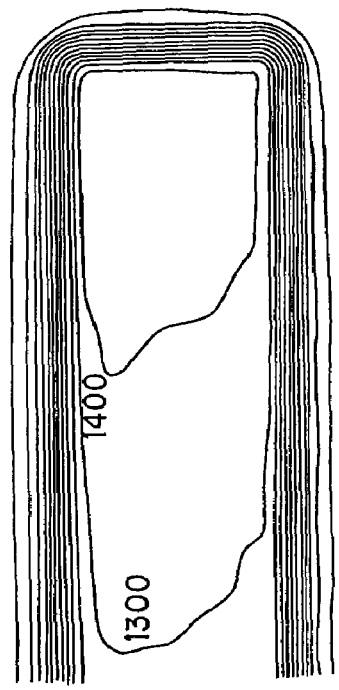
FIG. 21B is illustrative of the distribution of equal magnetization quantity curves at one end of the air bearing surface of the write shield layer in a comparative sample.
Figure 21A:
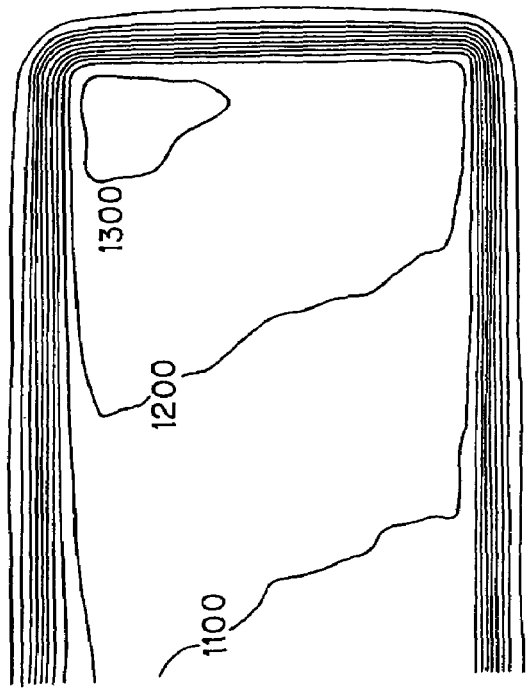
FIG. 21A is illustrative of the distribution of equal magnetization quantity curves at one end of the air bearing surface of the write shield layer in an inventive sample.

FIG. 21A is indicative of the distribution of equal-magnetization-quantity curves at one end of the air bearing surface of the write shield layer in the inventive sample, with the figures indicative of magnetic field intensities, and FIG. 21(B) is indicative of the distribution of equal-magnetization-quantity curves at one end of the air bearing surface of the write shield layer in the comparative sample, with the figures indicative of magnetic field intensities.

The advantages of the invention would be evident from the above results. That is, in the invention, both ends of the air bearing surface of the write shield layer 60 in the widthwise direction are made so thick that any concentration of the external magnetic field on them is prevented to improve on the external magnetic field resistance. By choice of such structure, portions of the write shield layer other than the vicinity of the air bearing surface can be slimmed down, so that the write shield layer is less affected by the external magnetic field, and inadvertent erasure of information already recorded in the recording medium can be avoided as much as possible. Besides, the PTP (pole tip protrusion) phenomenon resulting from the generation of heat from the coils, and external temperature changes can be held back.

What we claim is:

1. A method for producing a thin-film magnetic head comprising a recording head portion configured to record magnetic information on a recording medium, the method comprising:
    forming bottom spacer layer pieces made of a same material as a thin-film coil and to be spotted such that upon formation of the thin-film coil both ends near an air bearing surface of a write shield layer to be formed are raised;
    forming a thin-film coil adapted to generate a magnetic flux;
    forming a magnetic pole layer, which extends from a surface toward a rear, said surface being opposite to the recording medium moving in a medium traveling direction, and which is configured to generate a magnetic field for magnetizing said recording medium in a direction orthogonal to a surface thereof on the basis of the magnetic flux generated at said thin-film coil;
    forming an insulating film; and
    forming the write shield layer on the insulating film, the write shield layer being located on a side of said magnetic pole layer in said medium traveling direction, extending from said surface opposite to the recording medium toward the rear, being isolated by a gap layer from said magnetic pole layer on a side near to said surface opposite to the recording medium and joined through a back gap to said magnetic pole layer on a side far away from said surface opposite to the recording medium, and being set with respect to a widthwise full length W lying substantially on the air bearing surface that is opposite to the recording medium such that when said full length W is trisected, a maximum thickness $H_{1/3side}$ thereof in a range of widthwise ⅓W size positioned at both ends thereof is larger than an average thickness $H_m$ of the whole write shield layer from the air bearing surface up to the rear ($H_{1/3side} > H_m$).

2. The method for producing a thin-film magnetic head as recited in claim 1, wherein the write shield layer is formed directly on the bottom space layer pieces.

3. The method for producing a thin-film magnetic head as recited in claim 1, wherein in a run-on polishing position as far as the air bearing surface, the write shield layer is provided at both its ends with thick-film portions, each being typically in a hunch form.

* * * * *